United States Patent [19]

Mayer et al.

[11] 4,435,779

[45] Mar. 6, 1984

[54] DATA PROCESSING SYSTEM WITH PROGRAMMABLE GRAPHICS GENERATOR

[75] Inventors: Steven T. Mayer, Auburn; Jay G. Miner, Sunnyvale; Douglas G. Neubauer, Santa Clara; Joseph C. Decuir, Mountain View, all of Calif.

[73] Assignee: Atari, Inc., Sunnyvale, Calif.

[21] Appl. No.: 271,324

[22] Filed: Jun. 8, 1981

Related U.S. Application Data

[62] Division of Ser. No. 1,497, Jan. 8, 1979, Pat. No. 4,296,476.

[51] Int. Cl.³ .............................................. G06F 3/153
[52] U.S. Cl. ...................................... 364/900; 340/747
[58] Field of Search ...................... 364/200, 900, 521; 340/747

[56] References Cited

U.S. PATENT DOCUMENTS 4,116,444  9/1978  Mayer et al. .................. 340/747 X
4,146,925  3/1979  Green et al. ..................... 364/521
4,158,837  6/1979  Zahorsky ........................ 340/747 X
4,338,599  7/1982  Leininger ....................... 364/900 X Primary Examiner—Thomas M. Heckler
Attorney, Agent, or Firm—Townsend and Townsend

[57] ABSTRACT

A microprocessor based data processing system including a microprocessor, a memory unit, and a display unit is provided with a programmable graphics generator that transfers graphics information from the memory unit to the display unit in response to and control of a set of display instructions also stored in the memory unit. The graphics generator includes a first addressing unit for sequentially accessing the display instructions from the memory unit; a control unit for receiving, storing and decoding such instruction and for issuing supervisory and control signals in response to the binary state of each instruction; a second addressing unit for accessing graphics information from the memory unit in response to the supervisory signals from the control unit; and a third addressing unit for accessing movable object graphics stored in the memory unit.

13 Claims, 16 Drawing Figures

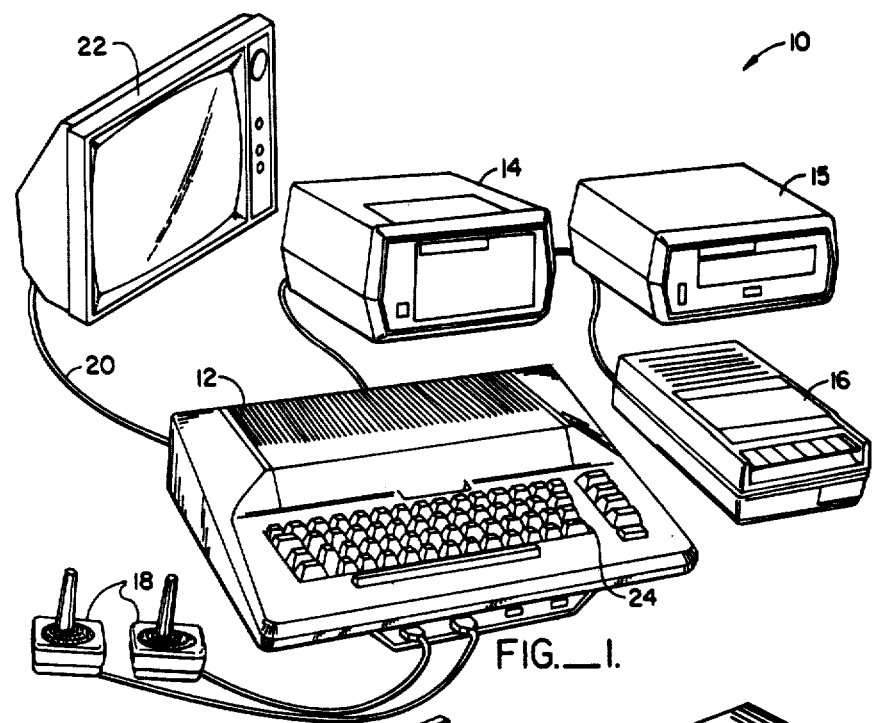
FIG._1.
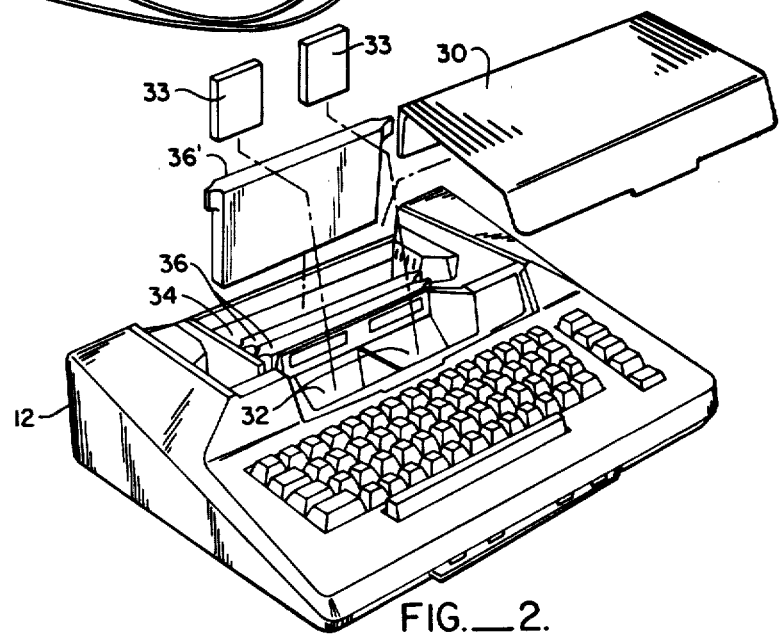
FIG._2.

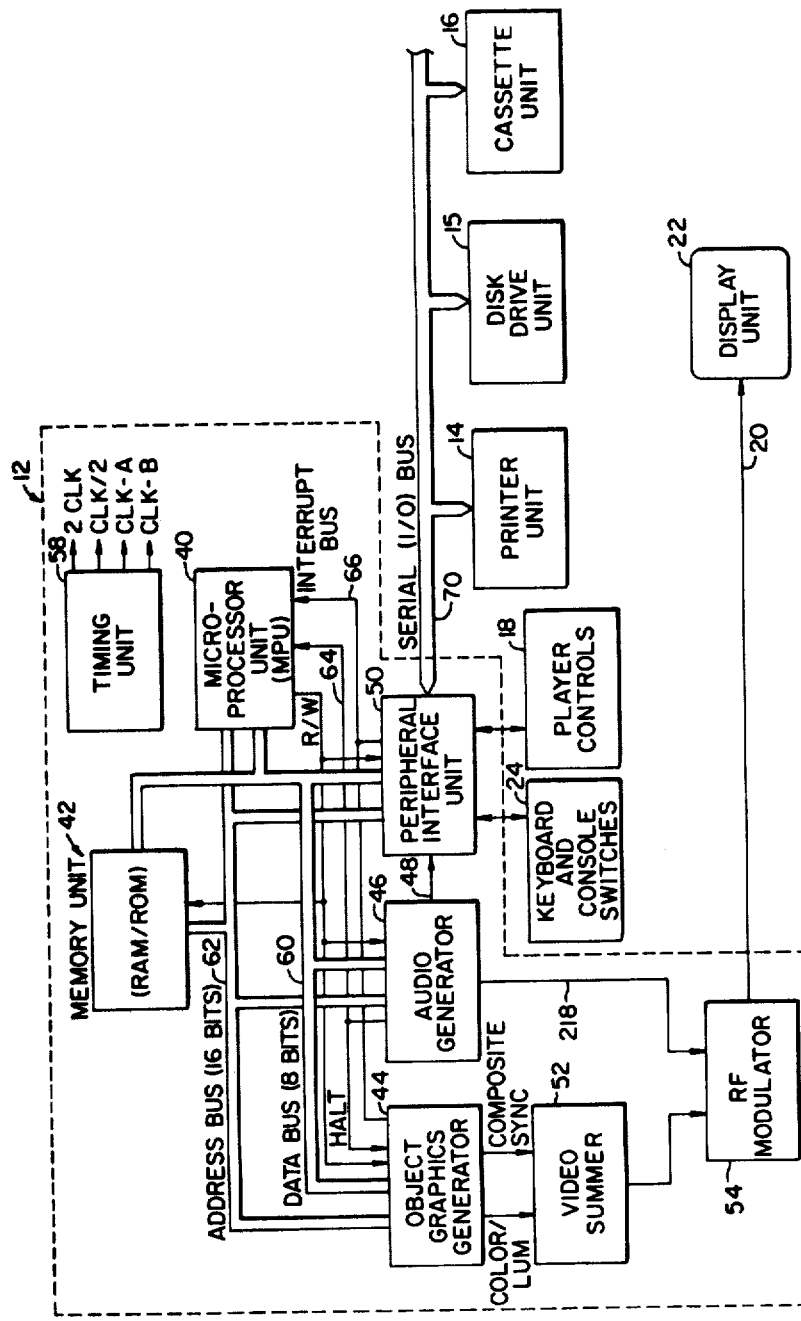
FIG._3.

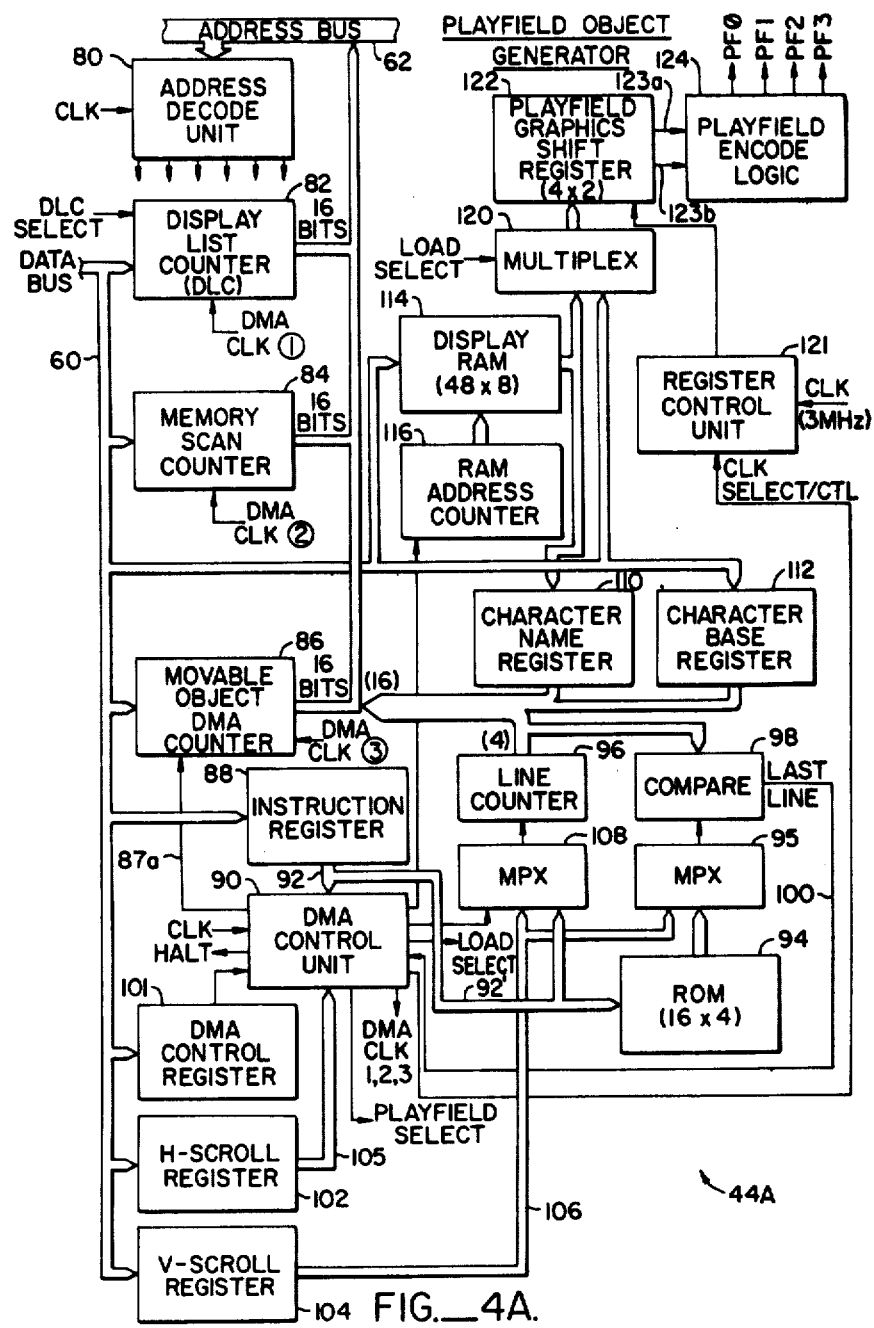
FIG._4A.

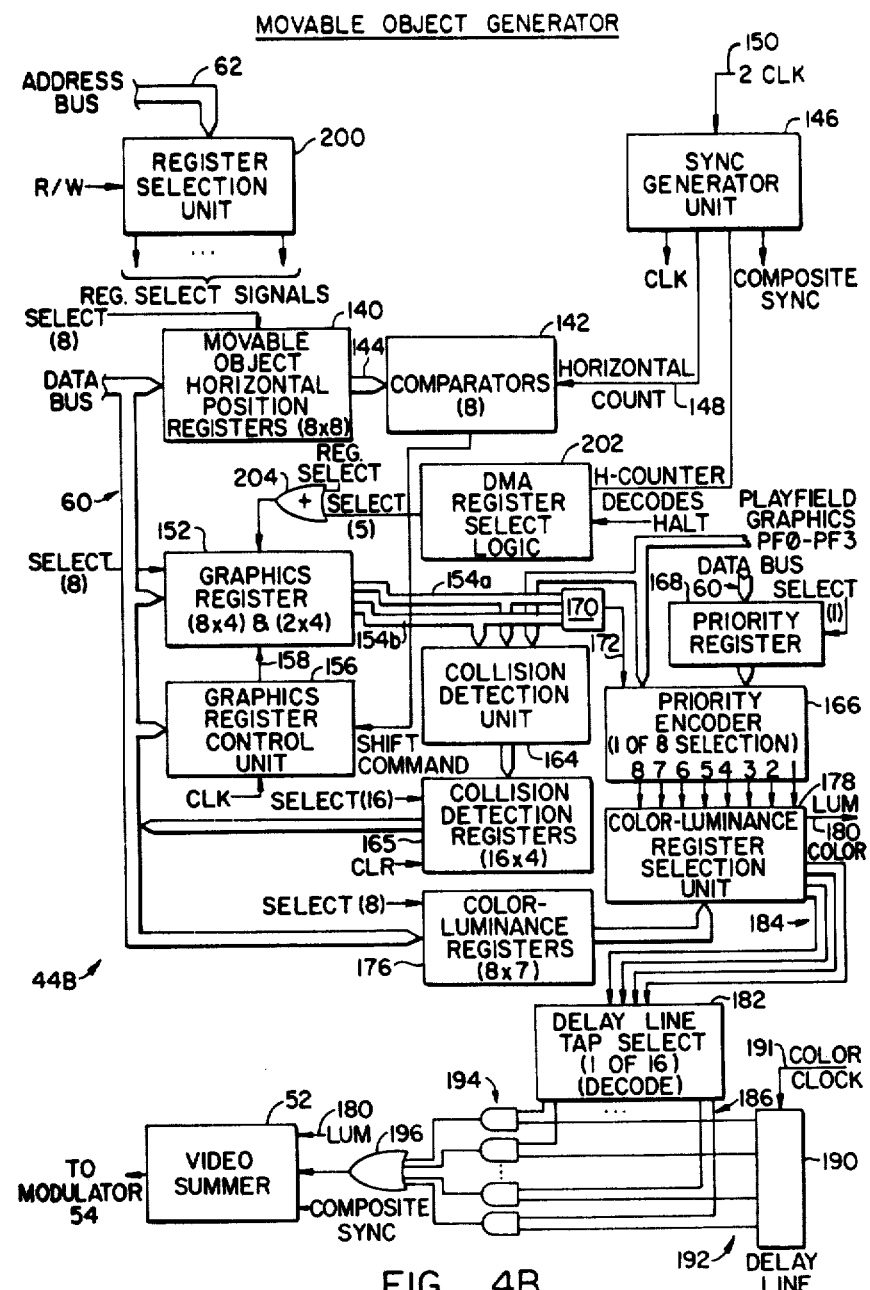
FIG._4B.

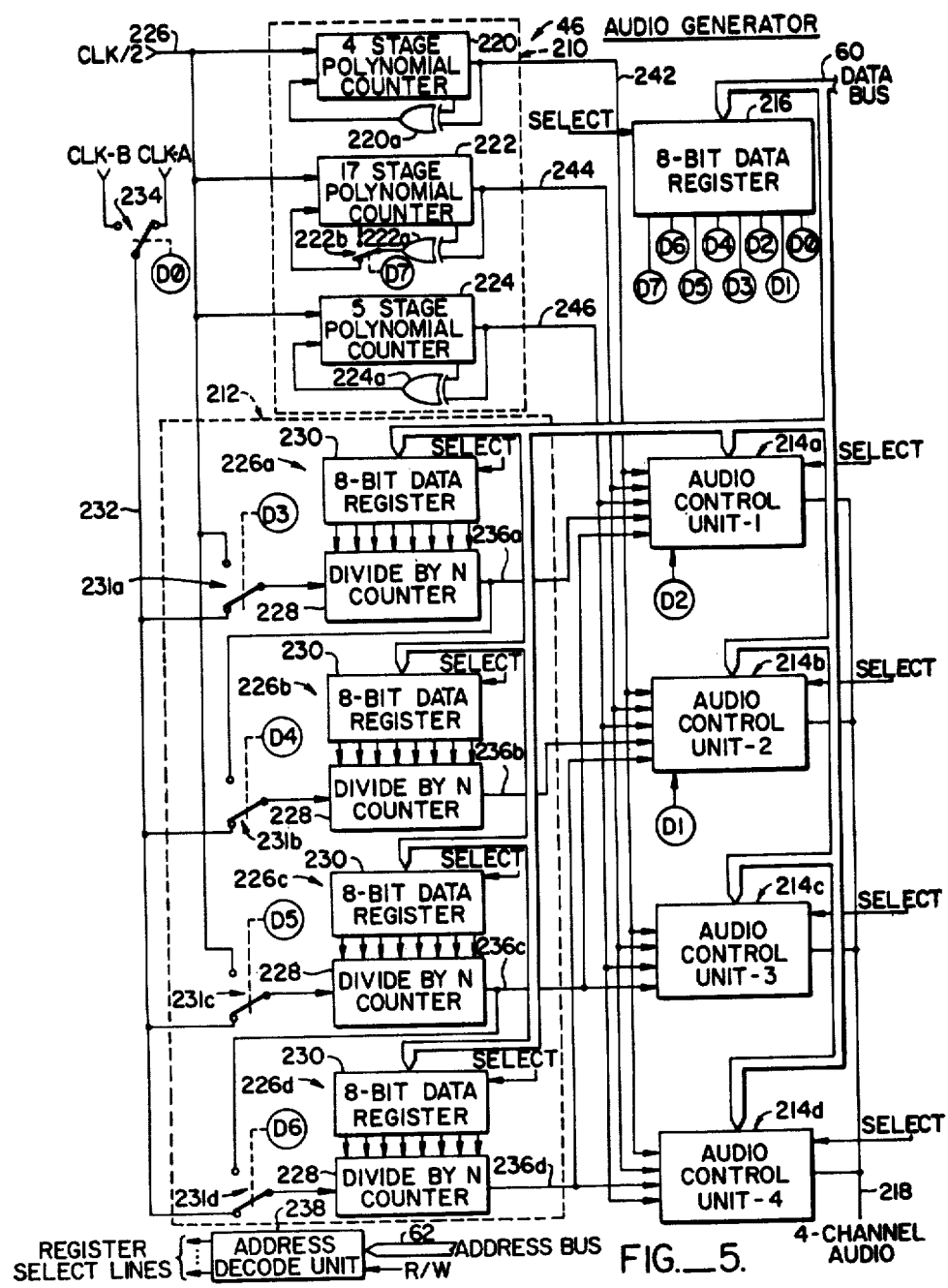
FIG._5.

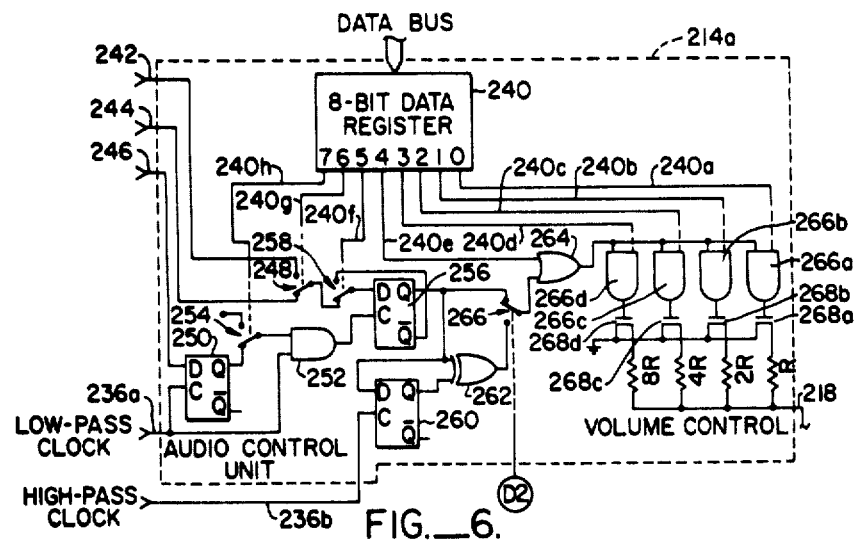
FIG._6.
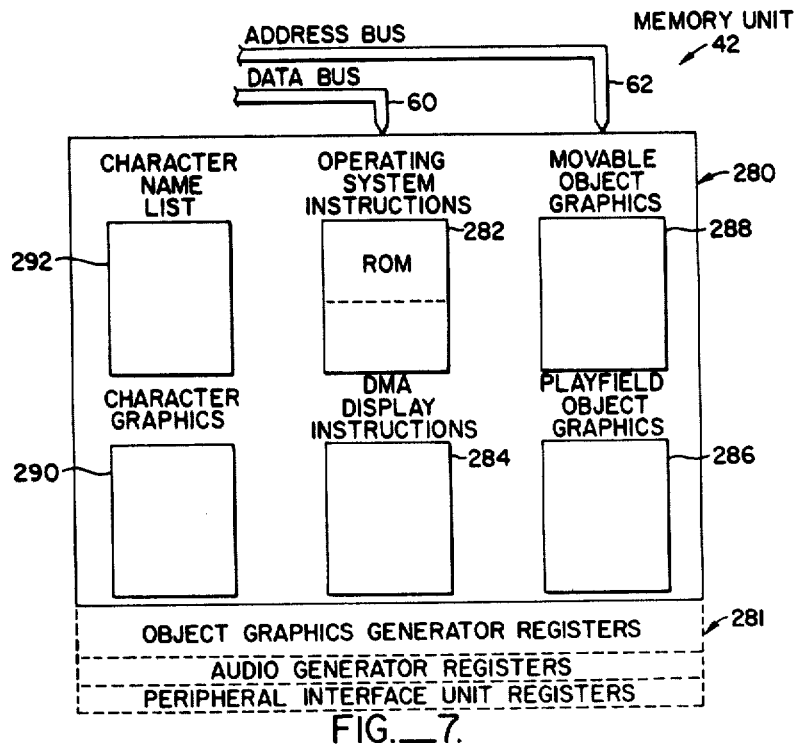
FIG._7.

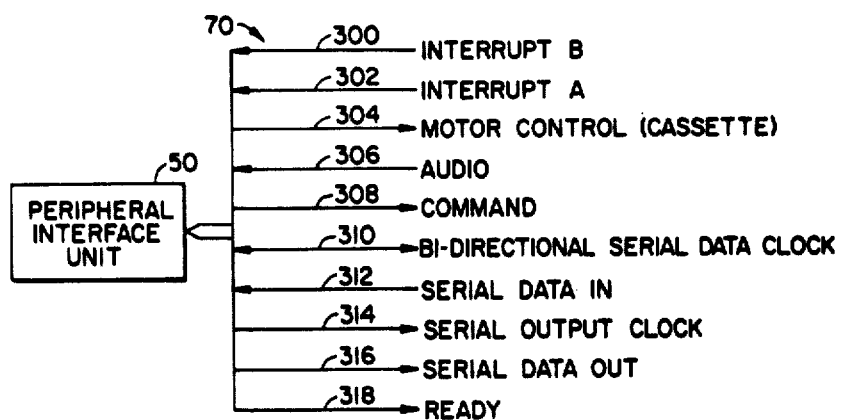
FIG._8.

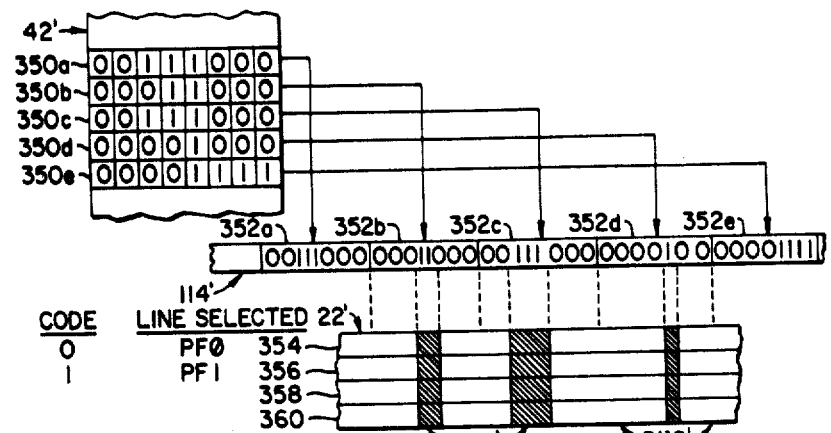
FIG._9.
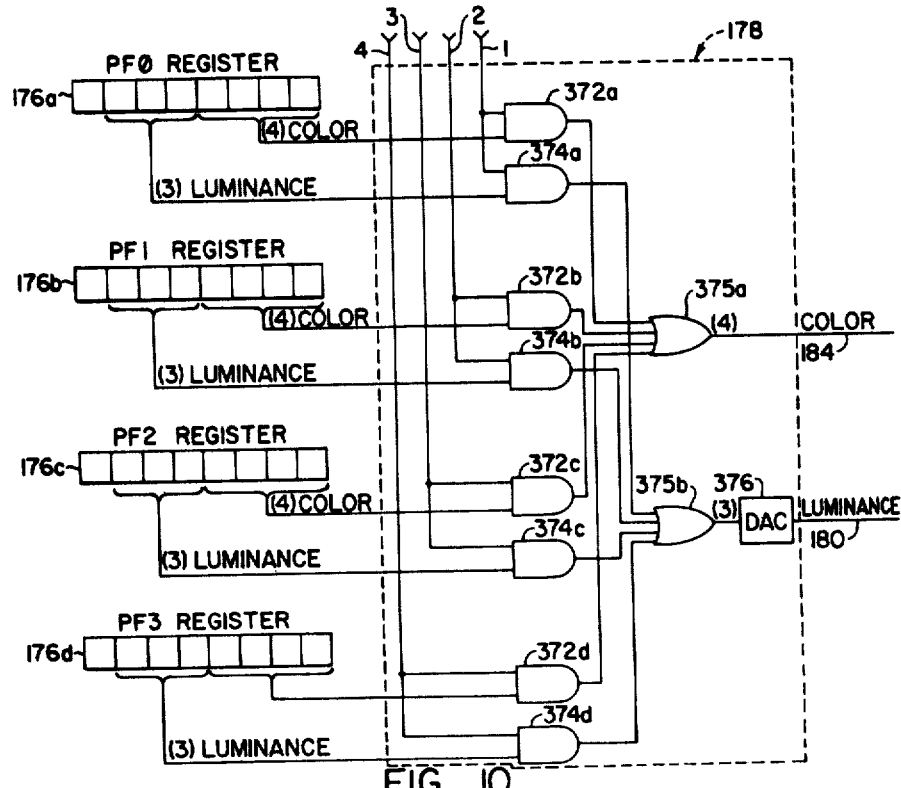
FIG._10.

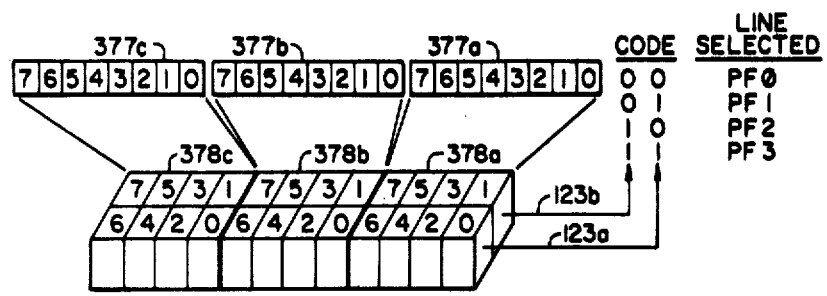
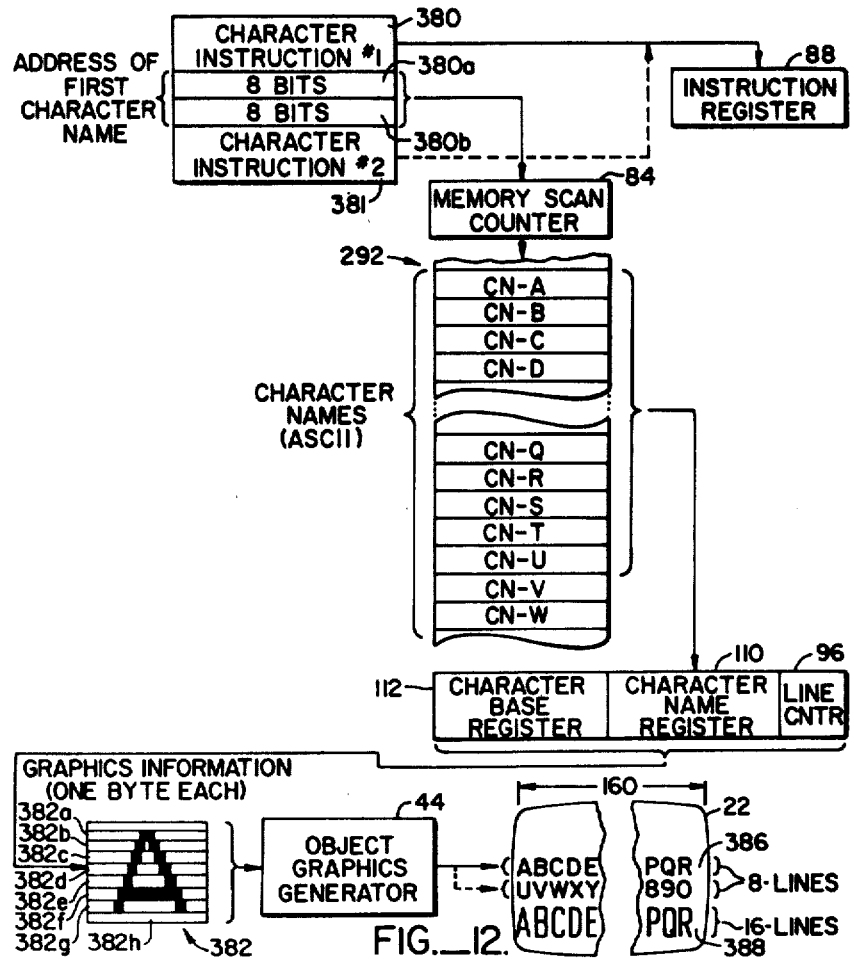
FIG._11.
FIG._12.

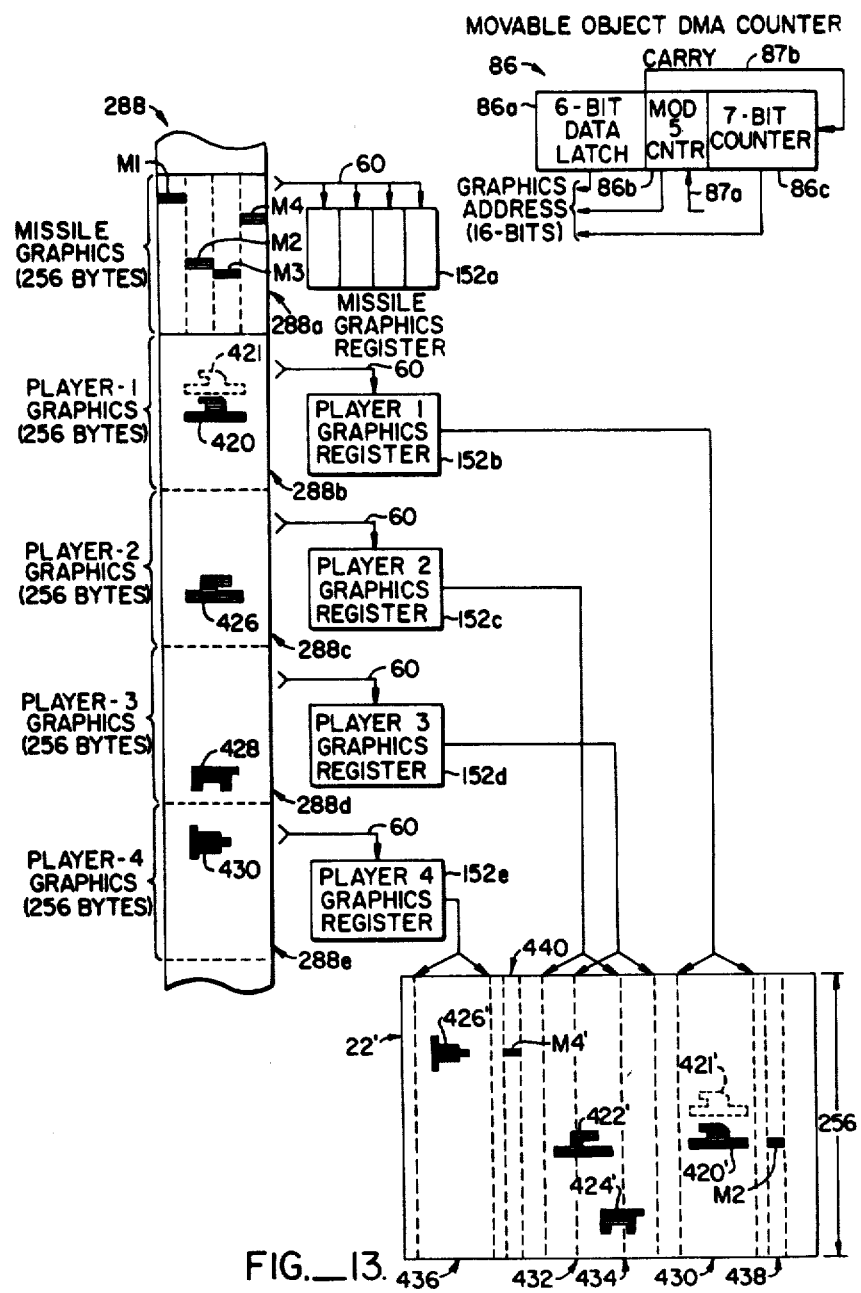
FIG._13.

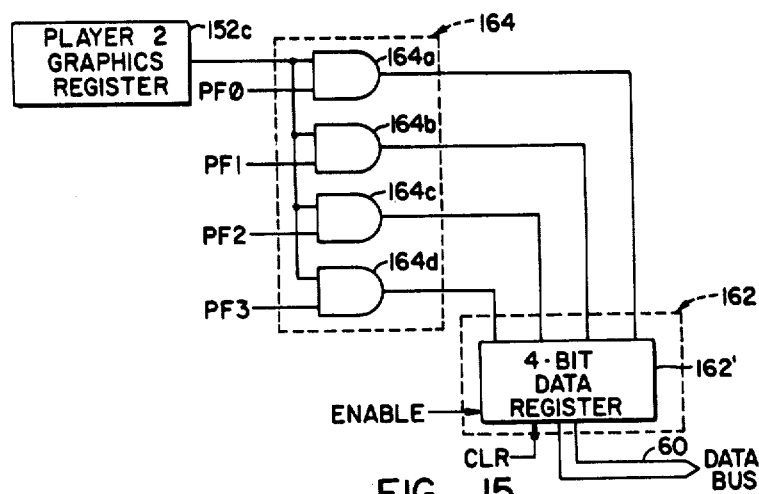
FIG.—15.
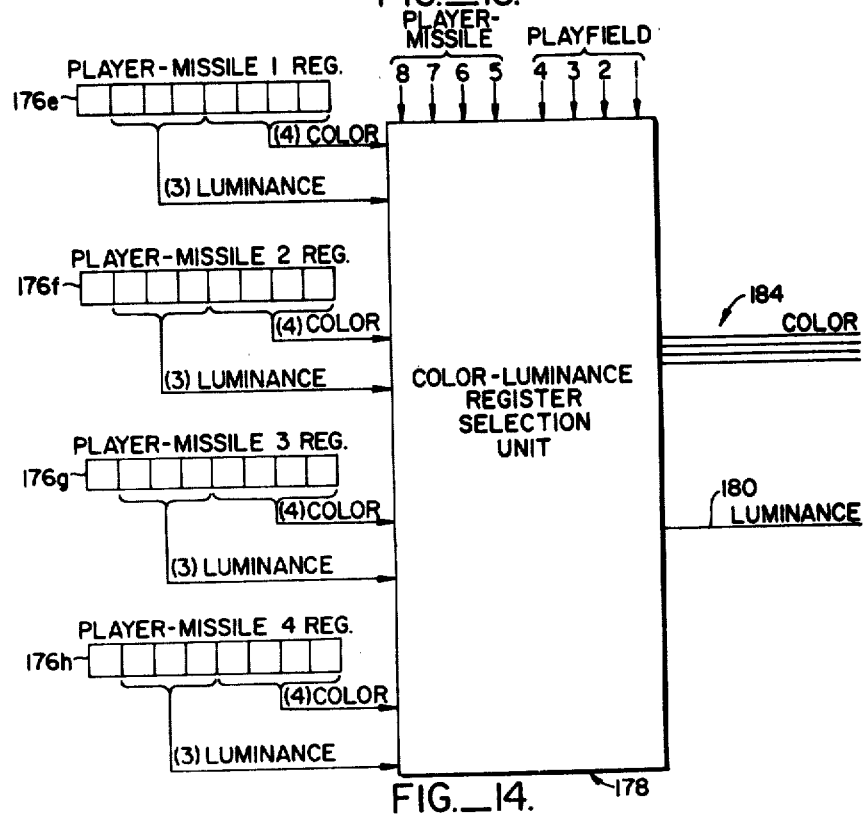
FIG.—14.

DATA PROCESSING SYSTEM WITH PROGRAMMABLE GRAPHICS GENERATOR

This is a division of application Ser. No. 1,497, filed Jan. 8, 1979 now U.S. Pat. No. 4,296,476.

BACKGROUND OF THE INVENTION

1. Field of the Invention

This invention generally relates to data processing systems and most particularly a microprocessor based data processor having a programmable graphics generator.

2. Background Discussion

Recent years have seen spectactular breakthroughs in the electronics industry in the area of microelectronics. Witness the variety and computing capabilities of the plethora of handheld calculators on the market today. These breakthroughs have made available for public consumption microprocessor units, essentially computers in very small packages, which have found their way in to a variety of consumer products—from microwave oven control to electronic games.

Now, a new industry is in the throes of formation. Based upon creative use of commercially available microprocessor units—such as the microcomputer manufactured by MOS Technology Inc., part number MCS6500—the public is being introduced to small, efficient data processing systems for home or (small) business use. These microprocessor data processing systems are available for a variety of personal uses, depending upon the particular software (programming) that accompanies the unit, ranging from programmed instruction, checklist balancing, mailing list sorts and updates, to entertainment games.

Information provided by a data processor system is commonly presented to a viewer via some type of printer unit or a video display unit. The printer has the advantage of providing the information in a relatively permanent form. The display unit displays information only while the unit is on, but a significant advantage of video display units is that much of the public possesses one in the form of a television receiver. Thus, there is already readily available to many potential purchasers of microprocessor based data processing systems a device, the television receiver, that can easily provide machine to man communication. Accordingly, many if not all microcomputer data processing systems are structured to communicate with raster-scan type video units (i.e., television receivers).

Presently available microcomputer units are usually characterized as very simple in detail but extremely complex in their overall operation. Relatively complex tasks are carried out by these microcomputers by performing a large number of simple operations. Thus, when processing such data—be it for an entertainment game or computing numeric amounts—the microcomputer actually may perform an extremely large number of these simple operations. In addition to its data processing functions, the microcomputer must effectively control the information transmission to the video display unit, including what and how the information is displayed. The microcomputer must, therefore, share its operation time between these two functions: data processing and information display control; and as one function places greater time-consuming demands upon the microcomputer unit, the other suffers accordingly.

As a result, many personal microprocessor based data processing systems tend to be somewhat slow in communicating the results of complex tasks to the user. Some attempts have been made to alleviate this annoying problem, however, but the result has not been altogether too satisfying. For example, one solution is to keep the tasks to be performed by the microcomputer relatively less complex. The number of individual operations required to perform the simpler tasks would be less and would, therefore, take less time. This solution, unfortunately, can severely limit the processing capabiliy of the microprocessor and the system. Another solution to the time problem is to increase the throughput of the microprocessor; that is to increase the size (e.g. number of bits) of the data word the microprocessor is capable of operating on. For example, if the microprocessor is designed to handle 8-bit data words (as most presently available microprocessors are), build a microprocessor capable of handling 12 or 16-bit words. However, as the word size handled by the microprocessor increases, so does the complexity, size and expense of the microprocessor—usually at a geometric rate. The present advantages of presently available large-scale, single-chip programmable microprocessors—that of being powerful, inexpensive, easy-to-use device—may be lost.

SUMMARY OF THE INVENTION

The present invention comprises a microprocessor based data processing system that includes a programmable objects graphics generator capable of executing a list of instructions that direct what and how graphic information will be displayed on a video display unit.

The data processing system of the present invention generally includes a microprocessor, a memory unit, an object graphics generator and a bus system comprising address and data buses that interconnect the elements of the system. The object graphics generator is adapted to sequentially access the memory unit for display instructions that direct what graphics is to be generated and how the graphics will be displayed. Under the direction of the display instructions, the object graphics generator executes additional memory unit accesses to obtain stored graphics information that is converted to video information of predetermined characteristics. The video information is communicated to a display unit, preferrably a conventional television receiver, where the information is displayed.

The object graphics generator includes a memory addressing unit that generates addressing signals, an instruction register, a control unit, temporary graphics storage, and a movable object generator unit. The addressing unit includes four separate counter circuits, each capable of generating address signals. A display list counter generates address signals that are used to sequentially access display list instructions from the memory unit. A memory scan counter generates address signals for accessing sequentially ordered strings of memory locations containing graphics information that is transferred to the display unit under the supervision and control of the object graphics generator control unit. A character addressing circuit provides addressing signals for transferring graphics information contained in selected blocks of memory locations from the memory unit to the display unit; each block of memory locations contains graphics information for an alphanumeric character or similar object. Finally, a movable object counter provides address signals for accessing movable object graphics that is transferred to the movable object graphics generator unit and temporarily stored.

The movable object generator unit includes horizontal position circuitry and graphics communicating circuitry for determining the horizontal position that a movable object is to be displayed on the display unit and for communicating the graphics information to the display unit for display. Graphics information is transferred to the movable object generator and communicated to the display unit so that the graphics information is displayed as a vertical swath containing the object video. The horizontal position of the swath's display is determined by position information received by the movable object generator from the microprocessor. Horizontal movement of the swath, and therefore the object, is effected by receiving new position information from the microprocessor. Vertical movement of the displayed movable object is effected by the microprocessor by erasing and rewriting the object graphics information as a new location with the swath graphics information stored in the memory unit.

An additional embodiment of the invention includes an audio generator capable of generating a plurality of audio sounds. The audio generator generally includes polynomial counters, divids-by-N counters and four audio control units. The polynomial counters provide signals having a broad range frequencies. The divide-by-N counters generate a periodic pulse train, the frequency of which is selectable by the microprocessor. The audio control units select which signals are to be communicated to an audio transducer (speaker) unit, their frequency content and amplitude.

A number of advantages are achieved by the present invention. First, a programmable graphics generator relieves the microprocessor of its graphics generating responsibilities. Since the graphics generator now assumes the task of accessing the memory unit for graphics information, formating the graphics for display and communicating the accessed graphics information to the display unit, the microprocessor is provided with more time to perform data processing functions.

Further advantages lie in the movable object generation utilized by the present invention. Since the movable object generator need only determine the horizontal location of the graphics information, only horizontal position circuitry is needed. Vertical position circuitry is deleted. Additionally, the vertical dimensions of the movable object is not limited by the circuitry used, as is sometimes the case. Since the object graphics information is located within the graphics information for generating a vertical swath, the vertical size of the object is limited only by the vertical height of the display.

This invention is pointed out with particularity in the appended claims. An understanding of the above summary and advantages of this invention, as well as other and further objects and advantages thereof, may be obtained by referring to the following description taken in conjunction with the drawings.

BRIEF DESCRIPTION OF THE DRAWINGS

FIG. 1 is a perspective view illustrating the component parts of the present invention;

FIG. 2 is a perspective view of the console unit with the top lid removed, illustrating the memory receptacles for receiving random access modules and read-only memory cartridges used in the present invention;

FIG. 3 is an overall schematic block diagram of the circuitry of the present invention;

FIGS. 4A and 4B are block diagrams of the object graphics generator shown in FIG. 3;

FIG. 5 is a block diagram of the audio signal generator control units shown in FIG. 3;

FIG. 6 is a schematic diagram of one of the audio control units shown in FIG. 5;

FIG. 7 is an illustrative diagram of the organization of the memory unit shown in FIG. 3;

FIG. 8A illustrates signals which are transferred over the serial (I/O) bus shown in FIG. 3;

FIG. 9 is an illustrative example of how play-field object graphics is generated by the object graphics generator shown in FIGS. 3 and 4;

FIG. 10 is a schematic of a color-luminance selection unit of the object graphics generator shown in FIGS. 3 and 4;

FIG. 11 is an illustration of packing graphics information;

FIG. 12 illustrates an indirect addressing technique used in conjunction with generating playfield characters;

FIG. 13 illustrates the method and apparatus used to store, transfer and communicate information stored and transferred to the display unit shown in FIG. 3;

FIG. 14 illustrates the color-luminance storage registers for movable objects; and FIG. 15 is a schematic of a portion of the collision detection logic shown in FIG. 4A.

DESCRIPTION OF AN ILLUSTRATIVE EMBODIMENT

A. General Description

1. The System Components

FIG. 1 illustrates the component parts of the data processing system of the present invention. The system, generally designated by the reference numeral 10, includes a console 12, printer, miniature "floppy" disk and cassette peripheral units 14, 15 and 16, respectively, game control apparatus (joysticks) 18 and a display unit 22, which preferably is a conventional television receiver. Console 12 couples a suitable radio frequency signal corresponding to one of the TV channels on line 20 to the TV antenna terminals (not shown) of the display unit 22.

The system 10 has two basic modes of operation: A first mode in which system 10 functions as a programmable general purpose computer; and a second mode in which system 10 functions as a video game unit. In the first mode, a personal home data processing system is provided that can be used for many information management tasks. For example, using the appropriate programming, the system can help one to perform such tasks as balancing checkbooks, plan meals, keep track of capital assets and stock portfolios and maintain mailing lists of family and friends—to name just a few of the system's information management capabilities. In addition, a variety of interactive educational materials can be provided through text, diagrams and pictures displayed on display unit 22, as well as audio. A dialogue can be conducted between the user and the system using the keyboard 24 and display unit 22. While operating the system 10 in this mode, the user may store or retrieve information, using one or more of the peripheral units 14-16. The display unit 22 provides the user with graphics information (typically an alphanumeric display) that is formulated and transmitted to the display unit 22 by the electronics contained in console 12 via the communicating line 20.

In the second basic mode, the system 10 is operated as a video game unit, providing games that may be played by one or more players. The console 12 contains the necessary circuitry for generating display objects which are viewable by the user on the display unit 22. Some of the display objects are movable or otherwise modifiable in response to user manipulation of the player controls 18 and are hereinafter referred to as "movable objects"; other of the objects may be relatively stationary such as for example, alphanumeric graphics, boundary lines or the like. These latter objects shall hereinafter be referred to as "playfield" objects.

Display units 22 is a raster scan display of the type utilizing an image-forming beam that traverses the screen along a plurality of sequentially scanned horizontal lines. Movement of the beam is synchronized to the video data supplied by the console 12 by means of conventional horizontal and vertical synchronizing signals, including signals defining horizontal and vertical retrace intervals.

Selection between the two basic modes of operation described above is made by providing the system 10 with the appropriate program. This is done by two ways. First, a program can be previously created and stored at the disk unit 15 or cassette unit 16, for example. The electronic circuitry contained in the console 12 has memory containing sufficient resident instructions to enable the user to call for the information so stored, thereby loading the operating program desired into a random access memory (RAM) section located in the console 12.

Alternatively, operating mode selection can be made by providing the system 10 with read-only memory (ROM) cartridges containing the desired operating program. Thus, as illustrated in FIG. 2, console 12 is provided with a removable top section 30 to expose receptacles 32, to receive the ROM cartridges 33. In addition, the console 12 is provided with memory receptacles 34 which receive additional memory packages, such as those designated by the reference numeral 36, to allow for expansion of the memory of the system 10. Depending upon the program contained in the ROM cartridge 33 inserted into one or both receptacles 32 of the console 12, the system 10 is capable of being utilized as a programmable general purpose computer system or a video game unit.

A block diagram of the system 10 is illustrated in FIG. 3. That portion of the system contained within the console 12 (illustrated in FIG. 3 as being enclosed by the dashed lines) includes a microprocessor unit (MPU) 40, a memory unit 42, object graphics and audio generators 44 and 46, respectively, and peripheral interface unit 50. In addition, the console 12 also contains a video summer unit 52, which receives and combines color, luminance and composite sync information from the object graphics generator to produce a composite signal that is applied to an R.F. modulator 34. The R.F. modulator also accepts an audio signal provided by the audio generator 46 and creates a suitable radio frequency signal containing the graphics and audio information and couples this signal to the display unit 22 via signal line 20.

MPU 40, memory unit 42, the generators 44 and 46 and peripheral interface unit 50 are interconnected by bidirectionally conducting data and address buses 60 and 62, respectively, to permit direct data and instruction transfers therebetween. Each unit coupled to the buses 60, 62 includes control sections containing data buffer registers, address decoding circuits for selection purposes, and other circuit elements necessary for unit control and/or information utilization. Certain details of these control sections are described in more detail below. Timing signals including various clock signals described in more detail below are generated by timing unit 58 and distributed to the various units housed within console 12 for use as necessary.

Memory unit 42 comprises both RAM and ROM type memory, including the ROM cartridges 33 and additional memory packages 34 referred to above. The memory unit is capable of achieving a maximum size of 64K characters, each character being one byte (8 bits). In order to provide sufficient addressing capability for the maximum memory capability, therefore, the address bus 62 is 16 bits wide. The data bus 60, of course, is eight bits wide.

Both the MPU 40 and object graphics generator 44 are capable of accessing memory unit 42. However, in order to avoid attempts at simultaneous memory access by these units, memory access priority is given to the object graphics generator. This is accomplished as follows: Prior to a memory read cycle by the generator 44, a HALT command is communicated to the MPU 40 on line 64. A signal appearing on this line inhibits access to memory unit 42 by MPU 40 during the immediately succeeding memory cycle time.

In addition to the data and address buses 60 and 62, respectively, as well as the HALT line 64, an interrupt bus 66 couples the object graphics generator 44 and peripheral interface unit 50 to MPU 40. The interrupt bus 66 communicates interrupt requests to the MPU 40, indicating occurrence of an event or requesting that the MPU 40 take certain action. For example, an interrupt signal may be communicated by the MPU 40 via the interrupt bus 66 by peripheral interface unit 50 indicating that information has been received from one of the peripheral units 14–16 and is available in an appropriate buffer register. Alternately, a signal may be generated by the peripheral unit 50 which communicates as indicated to the MPU 40 that data transmission from the peripheral interface unit to one of the peripheral units 14–16 has ended. In addition, the peripheral interface unit 50 may communicate an interrupt signal to the MPU 40 indicating that one of the keyboard switches 24 has been depressed and that information specifying the depressed switch is available for sampling by the MPU 40.

Interrupt signals communicated on the interrupt bus 66 from the object graphics generator 44 provide the MPU 40 with information concerning the state of video blank time or other display timing information.

Information transfers between the console 12 and peripheral units 14–16 are conducted via the serial I/O bus 70 under the general supervision of peripheral interface unit 50. As will be seen more particularly below, information may be communicated by the bus 70 via a number of selective modes and/or data rates.

2. The Object Graphics Generator

The object graphics generator 44 is shown in FIGS. 4A and 4B and includes a playfield object generator 44A (FIG. 4A) and a movable object generator 44B (FIG. 4B). The playfield object generator 44A is coupled to the address bus 62 via an address decode unit 80 which contains the necessary combinational logic to recognize, decode and issue the appropriate signals that selectively enable certain counters and data registers to accept information from or place information upon either the data bus 60 or the address bus 62.

One function of the playfield object generator 44A of FIG. 4A is to relieve the MPU 40 of many of the character-generating responsibilities, including the transfer of video graphics information from the memory unit 42 to the object graphics generator 44. Accordingly, the playfield object generator 44A is programmable and includes the capability of performing direct memory access (DMA) operations; that is, it controls transfer of graphics information from the memory unit 42 to the object graphics generator 44 without intervention by the MPU 40. Such DMA operations are guided by a set of instructions stored in the memory unit 42 that are sequentially accessed by the playfield object generator 44A during graphics generation. The addresses necessary for these DMA operations are obtained from one of three mutually exclusive sources; viz: either a display list counter 82, a memory scan counter 84, or a movable object DMA counter 86. In the preferred embodiment, each of the counters 82, 84 and 86 includes a multi-bit buffer latch, which holds the most significant bits (MSBs) of the address, with the remainder of the address contained in a presetable digital counter section. The counter section of each provides sequential addressing capability.

The display list counter 82 provides address signals that access the storage locations of memory unit 42 containing a sequential list of instructions which provide the playfield object generator 44A with information indicative of where (in memory unit 42) certain graphics information is stored, and how and when it is to be displayed. Each instruction is transferred via the data bus 60 to an 8-bit instruction (buffer) register 88 where it is temporarily held while being decoded. The contents of the instruction register 88 are applied to a DMA control unit 90 by register output lines 92. The DMA control unit 90 decodes the instruction and generates the necessary timing and control signals for initiating and controlling the various playfield generator functions.

As will be seen, each instruction results in the generation of one or more horizontal lines of graphic information for viewing on display unit 22. A new instruction is not fetched from memory unit 42 until the horizontal line or lines of graphic information commanded to be generated by the instruction presently held in instruction register 88 have been completed. Accordingly, the number of horizontal lines generated by or in response to each instruction must be counted. This is done by a line counter 96. Information indicative of the exact number of horizontal lines of playfield display to be generated is contained in a 4-bit portion of the instruction. This information is communicated to a ROM 94 which converts the 4-bit portion to the actual number of lines that are to be generated. The line count produced by line counter 96 is applied to a digital compare circuit 98 which compares the contents of the line counter to the quantity (number of lines to be generated) provided by the ROM 94. When the line counter 96 count equals the number of lines to be generated, a last line signal is produced by the compare circuit 98 that is communicated by the DMA control unit 90 on signal line 100. The DMA control unit 90 is thereby modified that the instruction presently held in the instruction register 88 has served its purpose and that a new instruction is to be fetched from the memory unit 42 and transferred to the instruction register 88.

Still referring to FIG. 4A, a pair of buffer registers 102 and 104 are coupled to the data bus 60. These registers, identified as H-scroll register 102 and V-scroll register 104, hold information that is used during horizontal and/or vertical scrolling. The horizontal scroll information contained in register 102 is communicated to the DMA control unit 90 by signal lines 105. The information contained in the V-scroll register 104 is communicated to a multiplexer circuit 108 which communicates the V-scroll information, when selected, to line counter 96 for presetting that counter.

The graphics information used to generate playfield objects is stored in memory unit 42 in one of two configurations: In a first configuration, graphics information is contained in a large number of sequentially oriented 8-bit bytes which are directly accessed one byte at a time by the playfield object generator 44A during the active scan of each horizontal line. In a second configuration, the graphics information is contained in character blocks of sequentially oriented bytes, each block typically containing graphics information for an alphanumeric character or similar display object. One byte of each block is transferred to the playfield object generator 44A during successive horizontal scans. This latter configuration affords greater flexibility in that the same character or characters can be generated many times during any one display field, calling upon the graphics information for the character when needed. To obtain full benefit of this latter feature, the blocks of character graphics information are accessed from memory unit 42 using an address formed from a character base portion, which points to the section of memory unit 42 containing the character blocks, a character name portion that points to the particular character block in the memory section, and line counter 96 which selects the particular byte of the character block.

Thus, the playfield object generator includes a character name register 110 and a character base register 112 for holding the base and name portions of character block addresses. As described more fully below, during active scan time the memory scan counter 84 provides sequential address signals for accessing memory unit 42 to obtain the character name portions of character addresses which are transferred to the character name register 110. There, the contents of the character name register are combined with that of the character base register 112 and line counter 96 to access memory unit 42 for graphics information.

The information sequentially transferred to the character name register 110 during active scan of the first horizontal line (and used to obtain information as described above) is used in a predetermined number of succeeding lines. Thus, rather than perform such memory accesses every line, the information obtained during the first line is stored in display RAM 114 and is sequentially accessed therefrom and transferred to the character name register 110 for generating the succeeding horizontal lines of a horizontal block of characters and/or objects.

Graphics information is, therefore, obtained from the memory unit 40 by the playfield object generator 44A using address signals provided by one of two sources; address signals are generated by the memory scan counter 84 or by address signals provided by the character base register 112, the character name register 110, and the line counter 96. In both cases, graphics information is transferred one byte at a time during the active horizontal line scan.

As will be described more fully below, there are times when graphics information displayed in one horizontal line is to be displayed in one or more immediately succeeding lines. When this is so, the graphics information for the first horizontal line is temporarily stored as accessed in display RAM 114 in sequential locations dictated by RAM address counter 116. Graphics information for the immediately succeeding line or lines is then obtained from the display RAM 114, thereby leaving the memory unit 42 free for used by the MPU 40.

When graphics information from blocks located in various memory locations of memory unit 42 is accessed, it is the quantity sequentially transferred to the character name register 110 and used as a part of the address for the stored graphics information that is used for a number of successive lines. In this case, as each byte of address information is transferred to the character name register 110, it is done to the display RAM 114 where it is temporarily stored. During the horizontal lines that immediately follow the first, address information is transferred to the character register 110 from the display RAM 114.

The graphics information itself, using either of the above-described methods of providing the address signals for accessing the graphics information, is communicated to multiplexer 120 and therethrough to playfield graphics shift register 122. When graphics information is obtained from the memory unit 42 in response to the address signals provided by the memory scan counter 84, it is transferred to the playfield graphics shift register 122 under the supervision and control of the DMA control unit 90 as follows: Each byte of the graphics information is first applied to the display RAM 114 via the data bus 60 where it is temporarily stored. The graphics information is immediately read out of the display RAM 114 and communicated to the playfield graphics shift register 122 via the multiplexer 120.

When address information is temporarily stored in the display RAM 114, the transfer of graphics information from the memory unit 42 is as follows: During the first horizontal line of the row of graphics to be displayed, the memory scan counter 84 provides sequential address signals of the memory locations of the address information to be transferred to the character name register 110. Each byte of such address information is communicated, via the data bus 60, to the display RAM 114 where it is temporarily stored. The byte just stored is immediately read out of the display RAM 114 and transferred to the character name register 110. The address signals formed by the contents of the character base register 112, the character name register 110, and the line counter 96 are then applied to the address bus 62 and used to access graphics information from the memory unit 42. The graphics information so accessed is communicated to the multiplexer 120, via the data bus 60, and therethrough to the playfield graphics shift register 122. Graphics information is transferred in the same manner during the horizontal lines that immediately follow this first line; however, the address information communicated to the character name register 110 is obtained from the display RAM 114.

The graphics information so transferred to the playfield graphics shift register 122 is then communicated to the playfield encode logic 124 in response to a clock signal supplied by the register control unit 121. The register control unit 121 receives from the timing unit 58 a 2CLK signal (approximately 7.2 MHz) and, under the supervision of the DMA control unit 90, communicates either this 2CLK signal to the playfield graphics shift register 122 or one of three binary divisions of this 2CLK signal (e.g., a 2CLK/2 or CLK signal that is approximately 3.6 MHz; a CLK/2 signal that is approximately 1.8 MHz; or a CLK/4 signal that is approximately 0.9 MHz). When one of the four signals 2CLK, CLK, CLK/2 or CLK/4 is applied to the playfield graphics shift register 122, the graphics information contained is shifted therefrom to the playfield encode logic 124 either one bit or two bits at a time for each clock pulse applied to the playfield graphics shift register 122 by the register control unit 121. This is described in more detail below. If the contents of the playfield graphics shift register is communicated therefrom one bit at a time, the information is communicated to the playfield encode logic 124 via the signal line 123a; the signal line 123b is kept at a logic zero. If the playfield graphics shift register contents is communicated therefrom two bits at a time, both the signal lines 123a and 123b are used.

As will be seen, selection of one or the other of these shift operations is accomplished by the supervisory signals produced by the DMA control unit 90 in response to the instructions received by the instruction register 88. In response to the information signals on signal lines 123a and 123b, the playfield encode logic selects one of four signal lines—designated PF∅, PF1, PF2, and PF3—to communicate video information to the movable object generator 44B (FIG. 4B) of the object graphics generator 44. There, as will be explained below, the selected signal line PF∅-PF3 and the information appearing thereon are used to select one of eight luminance values and one of sixteen color values corresponding to the playfield object to be displayed on display unit 22 (FIG. 3).

Referring now to FIG. 4B, there is illustrated the movable object generator 44B which, together with the playfield object generator 44A makes up the circuitry of the object graphics generator 44 shown in FIG. 3. In the preferred embodiment there is the capability of generating eight movable objects; the relative horizontal and horizontal positions of these movable objects when displayed on display unit 22 can change in response to user generated input signals from the player controls 18 or the keyboard and console switches 24. Four of the eight movable objects are player objects when the system 10 is in a game mode and the remaining four movable objects are missile objects—there being one missile object corresponding to each one of the player objects.

Graphics information for each player object is stored in the memory unit 42 (FIG. 3) and contained in a number of sequentially ordered bytes, with each byte corresponding to at least each one of the horizontal line scans of the display unit 22. Similarly, the graphics informtion for each of the missile objects is stored in a number of sequentially ordered bytes stored in the memory unit 42, but each byte contains two bits of graphics information for each missile object. In effect, the movable object generator 44B "maps" the sequentially ordered bytes of graphics information corresponding to each player object onto the display screen (not shown) of the display unit 22. This "mapping" of graphics information appears as a vertical column. In a similar fashion the missile object graphics information is displayed. The horizontal position at which each of the vertical column is to be displayed by the display unit 22 is calculated by the MPU 40 in response to information signals provided by the player controls 18 or the keyboard and console switches 24. The MPU 40 provides the movable object generator 44B with horizontal position information for each movable object which is used to effect communication of movable object graphics information to the display unit 22 at the right time during the active horizontal line time. This will be described in greater detail below.

Still referring to FIG. 4B, it can be seen that the movable object generator 44B is coupled to the data bus 60 by a plurality of connections. The data bus 60 is first coupled to each of eight movable object position (buffer) registers 140. Each of the registers 140 temporarily stores information transferred thereto from the MPU 40 that is indicative of the horizontal position of a corresponding object to be displayed on display unit 22. The content of each position register 140 is communicated to a corresponding one of eight digital comparators 142 via a corresponding one of eight signal lines 144. Also applied to each of the comparators 142 are horizontal count signals generated by a sync generator unit 146 and communicated to the comparators via signal lines 148.

The sync generator unit 146 receives on an input terminal 150 the 2CLK signal provided by timing unit 58 (FIG. 3). Contained within sync generator unit 146 are conventional digital counters coupled in series configuration which count the 2CLK signal produced by the timing unit 58 and derive therefrom horizontal and vertical sync signals which are combined to produce a composite sync. In addition, the horizontal and vertical sync counters are applied to conventional decode circuitry comprising combinational logic to produce predetermined horizontal and vertical (H-count and V-count) signals used for timing and controlling various logic and circuit components of the movable object generator 44B.

Still referring to FIG. 4B, the data bus 60 is also applied to eight conventional parallel-to-serial graphics shift registers 152. Four of the graphics shift registers 152 are for player object graphics information and each is 8 bits in size. The remaining four graphics shift registers 152 are 2 bits in size and are for missile object graphics information. There graphics registers 152 accept graphics information from the data bus 60 in parallel form and convert that information to serial video signals. The video signals from each one of the four player graphics shift registers 152 appear on one of four signal lines 154a, there being a signal line 154a corresponding to each one of the player graphics shift registers 152. Similarly, one of the four signal lines 154b corresponds to one of the missile graphics shift registers 152.

A graphics register control unit 156 generates shift pulses on signal lines 158 that are applied to a selected one of the eight graphics registers 152. When received, the shift pulses cause the graphics shift register 152 to serially shift its contents onto its corresponding video signal line 154a or 154b.

When the horizontal count signal produced by the sync generator unit 146 and conducted on signal line 148—which corresponds to the horizontal position of the electron beam scanning the display unit 22—equals the horizontal position information of any one of the position registers 140, a shift command signal is communicated by the appropriate comparator 142 to the register control unit 156. In turn, the register control unit 156 applies shift pulses to the corresponding graphics register 152, causing the selected graphics register to serially apply its contents to a one of the signal lines 154a (if player graphics) or 154b (if missile graphics).

The graphics information contained in the graphics registers 152 is converted to video data and communicated on signal lines 154a–154b to a collision detection unit 164 and a priority encoder 166. Also applied to the collision detection unit 164 and the priority encoder 166 are the playfield graphics via signal lines PF0=PF3. The eight video signal lines 154a and 154b and the four playfield graphics video signal lines PF0–PF3 are compared to one another by the collision detection unit 164 for the simultaneous occurrence of video data on any two lines. In this manner, a collision between any of the movable objects and/or between any of the movable objects and playfield objects is detected. When such a collision is detected, a signal indicative of collision is communicated to one of sixteen 4-bit buffer registers 165, where it is temporarily stored until accessed by MPU 40.

In the event that one of the movable objects overlaps another movable object or a playfield object, the priority encoder 166 determines which one of the simultaneously occurring objects will appear to be on top of (i.e., appear on display unit 22 in front of) the other object. Thus, movable objects (airplanes, for example) can be made to appear as if they move behind and become obscured by certain of the playfield objects (e.g., clouds) but in front of others. This determination is made in response to information transferred via the data bus 60 by MPU 40 to priority register 168. The priority register 168, as are the other registers coupled to the data bus 60, receives information in response to register select signals generated by the register selection unit 200, as will be described below.

It should be noted that no such determination need be made between a player object and its corresponding missile object. The reason being that a player object and its corresponding missils object are usually shown spaced from one another. Alternately, as will be more fully described below, a player object and its corresponding missils object have the same color and luminance characteristics so that even if they do overlap there is no need to distinquish between the two. Accordingly, each one of the four player graphics signal line 154a is ORed with its corresponding missile graphics line 154b by OR gates 170. The results of the logical ORing performed by gates 170 are communicated on four lines 172 to the priority encoder 166.

The priority encoder 166 monitors the eight input lines applied thereto (i.e., the four playfield graphics lines PF0–PF3 and the four movable object graphics lines 172) and, depending upon which of the lines have graphics video appearing thereon, selects one and only one of the lines 172 or PF0–PF3 for communication to the color-luminance selection unit 178 via the mutually exclusive encoder output lines 1–8. The priority encoder, therefore, determines which one of two or more simultaneous occurring object video is to be displayed. When no graphics information is presented to the priority encoder 166, or when the PF0 signal line only is active, the encoder output line 1 is active to select color-luminance information.

The register selection unit 178 functions to select one of eight color-luminance (buffer) registers 176. Each color-luminance register 176 contains information, transferred thereto over the data bus 60 by the MPU 40, that describes luminance (three bits allowing for eight selectable levels) and color (four bits, allowing for 16 selectable colors) of the object displayed on display unit 22.

The color-luminance register 176 selected by register selection unit 178 has the 3-bit portion describing luminance converted by the register selection unit 178 (by known methods) to an analog voltage level. This voltage level (luminance) is communicated via luminance line 180 to the video summer unit 152 for final transfer via the R.F. modulator 54 (FIG. 3) to the display unit 22.

The 4-bit contents of the selected register 176 describing color are communicated by unit 178 to a delay line tap select 182 via four signal lines 184. The tap select 182 is a four-to-sixteen decoder. The information appearing on signal lines 184 selects a one of the 16 mutually exclusive output lines 186 of the tap select.

An analog delay line circuit 190 receives on input terminal 191 a color clock signal generated by the timing unit 58 (FIG. 3). The delay line circuit 190 contains a number of known analog delay units to cause relative phase shifts of the signal received on input terminal 191. The phase shifted signals appear on the sixteen output lines 192 of the delay line circuit, each output line bearing a signal that is phase shifted a predetermined amount relative to the color clock and any other output line. These output lines 192 are applied to AND gates 194 where each individual output line 192 is ANDed with a corresponding one of the tap select output lines 186, thereby effecting selection of a one of the phase shifted signals. The AND gates 194 are coupled to an OR gate 196 which, in turn, communicates the selected signal to the video summer 152. The color signal is combined with the luminance signal appearing on line 180 and composite sync generated by the sync generator unit 146 to form a complex display signal that is communicated to the display unit 22 via the R.F. modulator 54 and terminal lines 20.

Information transfers from the MPU 40 to the movable object generator are supervised by the register selection unit 200. Generally, addresses designating a given register to be selected are coupled from the address bus 62 to the register selection unit 200 where they are decoded. The selection unit 200 combines the decoded address with a read-write (R/W) signal from MPU 40 to cause data to be written into or read from a selected register. In the case of a "write" command, for example, which is specified by an R/W signal of a first binary level, the register specified by the address on the data bus 62 is caused by the register selection unit 200 (e.g., one of the horizontal position registers 140) to receive and store the information present on the data bus 60 while the R/W signal persists. Alternatively, in the case of a "read" command, which is specified by an R/W signal of a second binary level, the contents of the selected register (e.g., one of the sixteen collision detection registers 165), are placed on the data bus 60 for transfer to the MPU 40.

Graphics information may be transferred to the individual graphics registers 152 by the MPU 40 as described above and by the playfield object generator independent of the MPU 40. Generally, the latter is accomplished as follows: During each horizontal blanking period, there are five predetermined time periods allocated to the transfer of graphics information from the memory unit 42 to the graphics registers 152 by the playfield generator; four of the time periods are allocated to the transfer of graphics data to the four player registers and the remaining time period is provided for the transfer of one-byte (8 bits) in parallel to the four, 2-bit, missile graphics registers. The DMA control unit 90 (FIG. 4A), in response to decoded horizontal count information from the sync generator unit 46, issues a HALT signal to the MPU 40 and the DMA register select logic 202. The HALT signal notifies the MPU 40 that the immediately upcoming memory cycle time of memory unit 42 is allocated to a fetch operated by the playfield object generator. Additionally, the DMA register select logic 202 of the movable object generator uses the HALT command, in combination with horizontal counter (H-counter) decodes, to enable the register corresponding to that predetermined time slot to accept the information that will appear on the data bus 60. The DMA control unit 90 then initiates a memory "fetch" routine by applying the contents of the movable object DMA counter 86 to the address bus 62 and issuing to the memory unit 42 a read command. In response, the memory unit 42 thereby places upon the data bus 60 the contents of the memory location designated by the address appearing on the address bus 62. At the same time, the DMA register select logic 202 generates a signal on one of five select lines which is applied via ORing logic 204, to the selected graphics register 152, causing the selected graphics register to accept and temporarily store the information then appearing on the data bus 60.

3. The Audio Generator

Referring now to FIG. 5, there is illustrated in further detail the audio generator 46 of the present invention. The audio generator produces a number of audio sounds such as tones, and such sound effects as shots, explosions, motors, gongs, and the like. The audio generator 46 includes a polynomial counter section 210, a divide-by-N counter section 212, audio control units 214a–214d and an 8-bit data register 216 that is provided information via the data bus 60 by the MPU 40. The content of the data register 216 are used to select the particular type of audio that is to be produced by the audio generator 46.

The polynomial counter section 210 includes three polynomial counters 220, 222 and 224, which are 4, 17 and 5-stage polynomial counters, respectively, and are used as noise generators. Each counter is driven by the CLK/2 signal (approximately 1.8 MHz) supplied to input terminal 226 by the timing unit 58 (FIG. 3). Each counter 220, 222, and 224 has a feedback loop including the gates 220a, 222a and 224a, respectively. Each counter is essentially a shift register with two stages coupled to the gates 220a–224a. Preferably, the stages to be coupled to gates 220a–224a are selected so that the counter obtains the maximum number of count states: $2^N - 1$, where N is the number of counter stages. Thus, for example, the last two stages of the 4-stage counter 220 are used while the last and third (i.e. middle) stages of the 5-stage counter 224 are used. For the 17-stage counter 222 the last and fifth from the last (i.e. the twelfth) stages are coupled to gate 222a. In addition, the 17-stage polynomial counter 222 has, in its feedback loop, a switch 222b that shortens the feedback loop by coupling gate 222a to an input of one of the interior stages of the counter (shift register) 222 when bit D7 of the register 216 is a binary one. The output of each of the polynomial counters is applied to each of the audio control units 214a–214d.

The divide-by-N counter section 212 contains four essentially identical divide-by-N counter circuits 226a–226d; each circuit includes a divide-by-N counter 228 whose division is controlled by an 8-bit data register 230 that is coupled to the data bus 60 for receipt of information from MPU 40. Each data register 230 is coupled to its corresponding counter 228, applying the contents of the register to determine the final frequency output of the counter.

The clock frequencies used to drive each divide-by-N counter 228 are selected by the select switches 231a–231d; the switches are controlled by the binary states of output D3, D4, D5 and D6 of register 216. The divide-by-N counter 228 of circuit 226a can, for example, be driven by the clock-A (CLK-A) signal applied to clock input line 232 (when the D0 and D3 outputs of the data register 216 are logic zeros). Alternately, the CLK/2 signal at input terminal 226 can be selected to drive counter circuit 228 when the D3 output of the register 216 is a logic one. In the preferred embodiment, the CLK-A signal is approximately 64 KHz, while the clock-B (CLK-B) signal is approximately 15 KHz. Both the CLK-A and the CLK-B signals are from the timing unit 58 (FIG. 3).

The final frequency output of each divide-by-N circuit 226a–226d is coupled via lines 236a–236d, respectively, to one or more of the audio control units 214a–214d in the manner illustrated. The signals applied to each audio control unit 214a–214d are selectively mixed and communicated to the R.F. modulator 54 (FIG. 3) via the audio signal line 218. The structure and function of each audio control unit will be more fully described hereinafter.

The audio generator 46 also includes an address decode unit 238 which receives as inputs the signals on the address bus 62, together with the R/W signal line. The address decode unit 238 decodes the address and supervises transfer of information from the data bus 60 to the designated register in the same manner that the register selection unit 200 (of the movable object generator 44B—FIG. 4B) did. The address and R/W signals are used by the address decode unit, therefore, to select one of the data registers of the audio generators (e.g., one of the 8-bit data registers 230) and cause the selected register to received and store information present on the data bus 60.

Referring now to FIG. 6, there is shown in greater detail audio control unit 214a. Each of the audio control units 214a–214d are essentially identical in construction so that a description of the audio control unit 214a will apply equally to the other control units. The circuit configuration of audio control units 214c and 214d are identical to each other but differ from that of audio control units 214a and 214b in one minor respect which will be pointed out below.

Thus, still referring to FIG. 6, the audio control unit 214a is shown as including an 8-bit data register 240 having output lines 240a–240h for communicating the contents of the register to various control circuits. The polynomial counter 220–224 (FIG. 5) are communicated to the audio control unit 214a by signal lines 242, 244 and 246, respectively. The input lines 242 and 244 are applied to a two-way select switch 248 while the signal line 246 is applied to the data (D) input of a D-type flip-flop 250. A low-pass clock frequency is applied to the clock (C) input of flip-flop 250, supplied by the divide-by-N circuit 226a (FIG. 5) via the signal line 236a. The Q output of the flip-flop 250 is communicated to an AND gate 252 via a two-way select switch 254. The gate 252, which has as its other input the low-pass clock appearing on signal line 236a, is coupled to the lock (C) input of a D-type flip-flop 256. Coupled to the data (D) input of the flip-flop 256 is a two-way select switch 258.

A high-pass clock is communicated to the audio control unit 214a on the signal line 236c from the divide-by-N circuit 236c and applied to the clock (C) input of flp-flop 260; the data (D) input of flip-flop 260 is coupled to the Q output of the flip-flop 256. The Q output of the flip-flop 260 is coupled to a volume control circuit via gates 262 and 264, and it is here that the audio control units 214a and 214b differ from 214c and 214d. Specifically, the audio control units 214c and 214d do not have a high-pass clock input, a flip-flop 260, a gate 262, or switch 266. Rather, the output (Q) of the flip-flop 256 is applied directly to the gate 264.

The gate 264 is coupled to a volume control circuit consisting of AND gates 266a–266d which drive MOS-type transistors 268a–268d. Volume control circuit is an effective digital-to-analog converter which utilizes the gated resistive summing of weighted resistors R, 2R, 4R and 8R which are selectively used to control amplitude, providing an analog output in response to a digital input to the AND gates 266a–266d. Selection depends upon the content of that portion of data register 240 that is communicated to the AND gates 266a–266d via the signal lines 240a–240d.

The output of polynomial counters, such as counters 220, 222 and 224, have a very broadband frequency spectrum and are generally referred to as providing "white" noise. The audio control units 21a–214d function, in a first instance, as low-pass filters to selectively limit the frquency content of the signal coupled to the audio line 218. The low-pass clock appearing on the signal line 236a acts, in conjunction with the flip-flops 250 and 256, to "sample" the polynomial counter signals appearing on input lines 242, 244 and 246. The outputs (Q) of each flip-flop 250 and 256 cannot change faster than the sampling rate (i.e., the low-pass clock). Accordingly, the frequencies passed by the flip-flops to gate 264 are limited by the rate at which the flip-flops are clocked, that rate being determined by the divide-by-N circuit 266a. Again, all audio control units possess this "low-pass" filter function, the sapling rate of audio control units 214b–214d being supplied by the divide-by-N counter circuits 266b–266d, respectively.

The audio control circuits 214a and 214b additionally possess a high-pass filter comprising the flip-flop 260 and gate 262. Here, the Q output of the flip-flop 256 is sampled by the flip-flop 260 at a rate determined by the high-pass clock signal appearing on the signal line 236b. In addition, both the Q outputs of the flip-flops 256 and 260 are applied to the EXCLUSIVE-OR gate 262. If the signal applied to the data (D) input to the flip:flop 260 is changing much faster than the signal applied to the clock (C) input, the gate 262 will, in effect, pass the data input (i.e., the Q output of the flip-flop 256) to the select switch 266. However, if the signal applied to the clock (C) input of flip-flop 260 is of a higher frequency than the signal applied to its data (D) input (i.e., the Q output of the flip-flop 256) the Q output of flip-flop 260 wil tend to follow its data (D) input and both inputs to the EXCLUSIVE-OR gate 262 will be mostly identical, giving very little output. The circuit of flip-flop 260 and EXCLUSIVE-OR gate 262 function as a single high-pass filter, passing noise whose minimum frequency is set by the high-pass clock signal appearing on the signal line 236b. Again, only the audio control units 214a and 214b possess such a high-pass filter.

The signals selected by each of the audio control units 214a-214d (FIG. 5) are applied to the 4 channel audio line 218. The 4-channel audio line 218 communicates the selected signal or signals to the R.F. modulator 54 (FIG. 3). The R.F. modulator 54 receives the audio signal with the composit video to form the radio frequency signal that communicates video and audio information to the display unit 22. When received by the display unit 22, the audio signal is extracted from the radio frequency by methods well known to those skilled in the art and applied to a conventional audio transducer element (e.g., speaker—not shown). The audio signal is converted to sound by the transducer elements (not shown).

4. The Peripheral Interface Unit

The peripheral interface unit 50 of FIG. 3 functions to sample information and temporarily hold information signals communicated thereto by the player controls and keyboard and console switches 24 until the MPU 40 is ready to receive the information. Some information such as for example depression of a key, requires the peripheral interface unit to notify the MPU 40 that information is presently available. Accordingly, the peripheral interface unit $5_0$ issues an interrupt signal that is communicated to the MPU 40 via the interupt bus 66. The MPU 40 then executes an interrupt routine to service the interrupt and read the appropriate buffer register (not shown) of the peripheral interface unit 50 holding the information.

The peripheral interface unit 50 also contains logic circuitry dedicated to the transmission of information between the peripheral interface unit 50 and the peripheral units 14, 16, and 18 attached thereto via the serial (I10) bus 70.

5. The Memory Unit

A typical organization for the memory unit 42 is illustrated in FIG. 7. Addresses are coupled to the memory unit by the address bus 62. Instructions or data are transferred to or from the memory unit via the data bus 60.

The memory unit 42 comprises a memory storage section 280 that includes both read-only memory (ROM) and random access memory (RAM) type memory. Typically, small portions of both the ROM and RAM type of memory are resident with the system. The resident portion of the ROM type memory contains the operating system instructions stored at ROM locations 282. These operating system instructions would include the instructions necessary for data handling between the peripheral interface unit and the peripheral units 14–16 attached thereto, as well as the keyboard and console switches 24. This resident ROM supplements the program ROM cartridges 33 (FIG. 2), which contain the operating system instructions for the particular usage of the entire system. Similarly, the RAM section 284 comprises a resident portion, supplemented by RAM modules 36 that are added to expand the memory capacity of the memory unit 42.

In addition, as has been noted, there are a number of data registers dispersed throughout the various circuitry heretofore described such as, for example, the character name and base registers 110, 112 (FIG. 4A), the graphics registers 152 and collision detection registers 165, (FIG. 4B) and the 8-bit data registers 216, 230 and 240 of the audio generator 46 (FIGS. 5 and 6). To the MPU 40, these registers appear as if they were a portion of the memory unit 42 in that they are each identifiable by a specific 16-bit address; some are capable of receiving information on the data bus 60 from the MPU 40, others are capable of being read by the MPU 40, and a few are capable of both receiving information from and transferring information to the MPU 40 via the data bus. Accordingly, these registers are aggregated and shown in FIG. 7 as a section 281 of continuous individual memory locations within the memory unit 42; each memory location within the section 281 is identified by a specific address. Thus, the MPU 40 writes (transfers data to) or reads (transfers data from) the memory locations (i.e., the registers) of the section 281 in the same manner as writing to or reading data from the section 280 of the memory unit 42: viz., Addressing the memory location via an address issued onto the address bus 62 by the MPU 40 and communicating a read or write command via the R/W signal line (FIG. 3).

The section 280 of the memory unit 42 is composed of both ROM and RAM type memory, as explained above, and is divided arbitrarily into blocks or groups of continuous memory locations for storing related instructions, graphics or other information in sequential order. For example, the memory locations that comprise memory block 282 contain the operating program instructions. These locations are typically addressed by the MPU 40. Similarly, the memory locations comprising memory block 284 have stored therein in the DMA display instructions; that is, those instructions used by the playfield object generator section of the graphics generator 44 to select, format and communicate to the display unit 22 a field of display objects (i.e., characters and the like). In similar fashion, the actual graphics information, that is the playfield object graphics, the movable object graphics, and the character graphics are stored in continuous memory locations forming the memory blocks 286, 288 and 290, respectively. The list of character names, used by the playfield generator to address those memory locations within the character graphics block 290 to obtain the graphics designated the character name, are stored in the continuous memory locations designated as memory block 292. These memory locations are typically addressed by the playfield object generator (FIG. 4A), as well as by the MPU 40.

The various RAM memory locations of memory unit 42, or the various data registers, are operated in a conventional manner in order to transfer information to or from a given location therein. For example, information is transferred to the memory unit 42 (i.e., a write operation) by the MPU 40 when a 16-bit address is gated to the address bus 62, an 8-bit data word is communicated to the data bus 60, and the R/W signal line is placed in the write state. Similarly, a read (or "fetch") operation is executed in much the same manner. If the read is executed by the object graphics generator 44 (i.e., the playfield object generator), it is preceded, as mentioned hereinbefore, by a signal on the HALT signal line to obviate the possibility of a concurrent read operation by the MPU 40.

6. The Serial (I/O) Data Bus

The peripheral units 14–16 and the peripheral interface unit 5, shown in FIG. 3, are interconnected by the serial (I/O) bus 70. This bus is generally designated as a bidirectionally conducting bus since information is transferred to and from the respective units over the same bus. As shown more specifically in FIG. 8, the bus 70 comprises several signal wires each reserved for a specific purpose. Two of the wires 300 and 302 conduct interrupt signals from the peripherals for transfer to the MPU 40 via the peripheral interface unit 50. The signal wire 304 communicates a motor control signal to the cassette peripheral unit 16 for operation of the tape transport motor (not shown) contained therein. An audio signal wire 306 communicates an electrical audio signal from the cassette peripheral unit 16 to the peripheral interface unit 50.

The remaining signal wires communicate digital data and status information between the peripheral interface unit 50 and the peripheral units connected to the bus 70 in serial fashion at data (baud) rates that may be selected by the MPU 40 or certain of the peripherals. specifically, a signal wire 308 communicates a COMMAND signal of a first binary state to the peripheral units 14 and 15 to notify the peripheral units 14 and 15 of the presence of command data information being on the serial (I10) bus 70. A signal wire 310 communicates a bidirectional data clock signal between the peripheral unit interface 50 and the peripheral units 14–16; the bidirectional data clock signal communicated by the signal line 310 can originate at the peripheral units 14–16 or is provided by the peripheral interface unit 50. A signal wire 312 communicates serial data from the peripheral units 14–16 to the peripheral interface unit 50. A signal line 314 communicates a data clock signal to the peripheral units 14–16 for use in conjunction with the transfer of serial data present on the signal line 316 to the peripheral units 14–16. Finally, a READY signal is communicated to the peripheral units 14–16 to indicate that the peripheral interface unit 50 is in condition for receiving information from the peripheral units 14–16.

B. Object Graphics Generator

In order to fully understand and appreciate the inventions the operation of the object graphics generator 44 will now be described beginning with a description of the instruction set. Each instruction consists of an operation code, certain flag bits, and a two-byte address (omitted from some instructions) used to direct the object graphics generator to another section of memory containing further display instructions or graphics information. These instructions allow the object graphics generator 44 to generate graphics information substantially independent of the MPU 40. The operation, address mode and graphics generation codes in a display instruction are interrelated and constitute primary signals of the DMA control unit 90 of the playfield object generator when the instruction is decoded. The function of these instructions is as follows.

1. Display Instructions

Display instructions are operated on and carried out by the graphics generator 44 only. They are not microprocessor instructions. Properly programmed with these instructions, the object graphics generator can create a desired display format for viewing on the display unit 22. Playfield objects, such as lines, borders, characters, etc. can be displayed on display unit 22 with very little, if any, intervention in the graphics generation process by the MPU 40. As a result, the MPU 40 is freed from its usual object graphics generating tasks to perform other processing operations.

Instructions are either one byte or three bytes in size. One-byte instructions are typically display mode control instructions used to define the manner, mode and method with which playfield object graphics information is displayed by the display unit 22. The three-byte instructions are typically a one byte instruction followed by two bytes of address information which specify to the object generator 44 the location of graphics information within the memory unit 42 or the location of another list of display instructions to which the generator 44 is to "jump". When a specific instruction is transferred to the instruction register 88 and decoded by the DMA control unit 90 (FIG. 4A), output signals are produced that generally control the selection and transfer of graphics information from predetermined memory locations of the memory unit 42 to the video summer 52 where it is then communicated by R.F. modulator 54 to the display unit 22 (FIG. 3).

The instructions are formed as shown in Table I, below:

TABLE I—PLAYFIELD OBJECT GENERATOR INSTRUCTIONS

A. DISPLAY MODE INSTRUCTIONS

These instructions define the manner in which graphics information is obtained from the memory unit 42 (i.e., by direct addressing or indirect addressing using character names) to the playfield object generator (FIG. 4A) and therefrom on to the display unit 22. Display mode instructions select the clock signal applied to the graphics shift register 122 by the register control unit 121, whether a horizontal line of graphics information will be displayed as multiple horizontal lines on display unit 22, or whether graphics information is transferred from the graphics register 122 to the playfield encode logic 124 one bit at a time or two bits at a time. Instruction number 1 causes generation of one or more blank horizontal lines; instruction numbers 2–9 generate playfield objects by, in effect, communicating graphics information directly from the memory unit 42 to the display unit 22; and instruction numbers 10–15 generate horizontal blocks of characters using a list of character names in an indirect addressing method. Data bits D∅–D3, inclusive, form the operation code of the instruction. "X's" in any bit position of an instruction indicated that the bit is disregarded or has other uses.

INSTRUCTION NO. 1:

| DATA BITS: | | | | | | | |
|---|---|---|---|---|---|---|---|
| D7 | D6 | D5 | D4 | D3 | D2 | D1 | D0 |
| X | N | N | N | 0 | 0 | 0 | 0 |

Description: This instruction causes generation of one to eight horizontal lines of blank video. The number of horizontal lines is designated by data bits D4–D6 (e.g., 000 equals one horizontal blank line, 111 equals eight). The color and luminance of each horizontal line so generated are determined by the information contained in the color-luminance register selected by signal the line PFO that is communicated from the playfield object generator 44A (FIG. 4A) to the movable object generator 44B (FIG. 4B). In effect, no graphics information is transferred from the playfield encode logic 124 (FIG. 4A) to the priority encoder 168 (FIG. 4B). Under this condition, if there is also an absence of movable object graphics, the priority encoder 166 forces output 9 thereof to a state that causes the background color-luminance register (one of the registers 176) to be continuously selected for the number of lines to be generated.

INSTRUCTION NO. 2:

| DATA BITS: | | | | | | | |
|---|---|---|---|---|---|---|---|
| D7 | D6 | D5 | D4 | D3 | D2 | D1 | D0 |
| X | X | X | X | 1 | 1 | 1 | 1 |

Description: Graphics information is transferred from the memory unit 42 (FIG. 3) to the playfield graphics shift register 122 (FIG. 4A) of the playfield object generator a byte at a time during active scan of a horizontal line. The information is then shifted from the shift register one bit at a time, appearing as video data on signal line 123a and is transferred from the playfield encode logic 124 to the priority encoder via either the PF∅ or PF1 signal lines—depending upon the logical state of the data bit then being communicated. The clock signal applied to the shift register is 2CLK (approximately 7.2 MHz).

INSTRUCTION NO. 3:

| DATA BITS: | | | | | | | |
|---|---|---|---|---|---|---|---|
| D7 | D6 | D5 | D4 | D3 | D2 | D1 | D0 |
| X | X | X | X | 1 | 1 | 1 | 0 |

Description: This instruction is essentially the same as instruction No. 2, above, except that the graphics shift register 122 has CLK applied thereto by the register control unit 121 and the graphics information is transferred from the register 122 two bits at a time. Thus, any one of the four playfield encode logic 124 output lines PF∅-PF3 may be activated.

INSTRUCTION NO. 4:

| DATA BITS: | | | | | | | |
|---|---|---|---|---|---|---|---|
| D7 | D6 | D5 | D4 | D3 | D2 | D1 | D0 |
| X | X | X | X | 1 | 1 | 0 | 1 |

Description: Essentially the same as instruction No. 2 (i.e., shift clock=CLK; data shifted two bits at a time from shift register 122) except that graphics information for a complete horizontal line is stored in the display RAM 114 as it is transferred to the graphics shift register 122 during generation of a first horizontal line. An immediately following horizontal line is then generated using the graphics stored in the display RAM.

INSTRUCTION NO. 5:

| DATA BITS: | | | | | | | |
|---|---|---|---|---|---|---|---|
| D7 | D6 | D5 | D4 | D3 | D2 | D1 | D0 |
| X | X | X | X | 1 | 1 | 0 | 0 |

Description: Essentially the same as instruction No. 2, except that data is shifted one bit at a time.

INSTRUCTION NO. 6:

| DATA BITS: | | | | | | | |
|---|---|---|---|---|---|---|---|
| D7 | D6 | D5 | D4 | D3 | D2 | D1 | D0 |
| X | X | X | X | 1 | 0 | 1 | 1 |

Description: Shift clock=CLK; shifted one bit at a time; displayed for two consecutive horizontal lines.

INSTRUCTION NO. 7:

| DATA BITS: | | | | | | | |
|---|---|---|---|---|---|---|---|
| D7 | D6 | D5 | D4 | D3 | D2 | D1 | D0 |
| X | X | X | X | 1 | 0 | 1 | 0 |

Description: Shift clock=CLK/2; shifted two bits at a time; displayed for four consecutive lines.

INSTRUCTION NO. 8:

| DATA BITS: | | | | | | | |
|---|---|---|---|---|---|---|---|
| D7 | D6 | D5 | D4 | D3 | D2 | D1 | D0 |
| X | X | X | X | 1 | 0 | 0 | 1 |

Description: Shift clock=CLK/2; shifted one bit at a time; displayed for four consecutive horizontal lines.

INSTRUCTION NO. 9:

| DATA BITS: | | | | | | | |
|---|---|---|---|---|---|---|---|
| D7 | D6 | D5 | D4 | D3 | D2 | D1 | D0 |
| X | X | X | X | 1 | 0 | 0 | 0 |

Description: Shift clock=CLK/4; shifted two bits at a time; displayed for eight horizontal consecutive lines.

INSTRUCTION NO. 10:

| DATA BITS: | | | | | | | |
|---|---|---|---|---|---|---|---|
| D7 | D6 | D5 | D4 | D3 | D2 | D1 | D0 |
| X | X | X | X | 0 | 1 | 1 | 1 |

Description: This and the following instruction Nos. 11-15 cause conversion of the graphics information that is transferred from memory unit 42 to the graphics generator 44 in much the same manner as do instruction Nos. 2-9, above. Instructions Nos. 10-15 differ from the foregoing instructions in the procedure used to obtain graphics information from the memory unit 42. Essentially, this and instruction Nos. 10-15 are used to generate a horizontal swath of video displayed on display unit 22, each swath containing either 20 or 40 characters, each character swath being 8, 10 or 16 vertical lines high. Additionally, these instructions (as do instruction Nos. 2-9, above) specify the clock rate for the graphics shift register 122 (FIG. 4A) and whether information is communicated from the register 122 to encode logic 124 one or two bits at a time. Instructions Nos. 10-15 access the graphics information from memory unit 42 via an indirect addressing scheme that will be described more fully below. Instruction No. 10 causes (1) the CLK signal to be applied to the graphics shift register 122 (2) information to be communicated from the register 122 one bit at a time via signal line 123a, (3) 20 characters per horizontal swath to be generated, (4) 16 consecutive horizontal lines to be displayed for each swath, and (5) every two consecutive horizontal lines of graphics display to be identical (e.g., the second line of a pair contains the same graphics video as the first line).

INSTRUCTION NO. 11:

| DATA BITS: | | | | | | | |
|---|---|---|---|---|---|---|---|
| D7 | D6 | D5 | D4 | D3 | D2 | D1 | D0 |
| X | X | X | X | 0 | 1 | 1 | 0 |

Description: This instruction is the same as the immediately preceding instruction except that there is no duplication of any horizontal line of graphics information and this instruction uses only eight consecutive horizontal lines per swath.

INSTRUCTION NO. 12:

| DATA BITS: | | | | | | | |
|---|---|---|---|---|---|---|---|
| D7 | D6 | D5 | D4 | D3 | D2 | D1 | D0 |
| X | X | X | X | 0 | 1 | 0 | 1 |

Description: Shift clock=CLK; graphics information is transferred from the graphics register 122 two bits at a time; every two consecutive horizntal lines are identical; 16 consecutive horizontal lines are displayed.

INSTRUCTION NO. 13:

| DATA BITS: | | | | | | | |
|---|---|---|---|---|---|---|---|
| D7 | D6 | D5 | D4 | D3 | D2 | D1 | D0 |
| X | X | X | X | 0 | 1 | 0 | 0 |

Description: This instruction is identical to the immediately preceding instruction except that there is no duplication of any horizontal line of graphics information and only eight consecutive horizontal lines are displayed.

INSTRUCTION NO. 14:

| DATA BITS: | | | | | | | |
|---|---|---|---|---|---|---|---|
| D7 | D6 | D5 | D4 | D3 | D2 | D1 | D0 |
| X | X | X | X | 0 | 0 | 1 | 1 |

Description: Shift clock=2 CLK; graphics information shifted one bit at a time; 10 consecutive horizontal lines are displayed.

INSTRUCTION NO. 15:

| DATA BITS: | | | | | | | |
|---|---|---|---|---|---|---|---|
| D7 | D6 | D5 | D4 | D3 | D2 | D1 | D0 |
| X | X | X | X | 0 | 0 | 1 | 0 |

Description: Shift clock=2 CLK; graphics information shifted one bit at a time; uses eight consecutive horizontal lines are displayed.

B. JUMP INSTRUCTION

INSTRUCTION NO. 16:

| DATA BITS: | | | | | | | |
|---|---|---|---|---|---|---|---|
| D7 | D6 | D5 | D4 | D3 | D2 | D1 | D0 |
| X | X | X | X | 0 | 0 | 0 | 1 |

Description: This is a 3-byte instruction; the byte containing the operation code is immediately followed by two more bytes which form the address of the memory location within memory unit 42 containing the next sequential instruction to be executed by the graphics generator 44. When decoded by the DMA control unit 90 (FIG. 4A), control and timing signals are issued therefrom to cause the two bytes following the instruction to be transferred from the memory unit 42 to the display list counter 82.

FLAG BITS

The data bits D7-D4 of any particular instruction may direct that further action, in addition to that specified by the operation code (i.e., data bits D3-D$\emptyset$), be taken—depending upon the logical state of that bit D7-D4 of the instruction. Flag bits are disregarded for the blank (instruction no. 1) and jump (instruction no. 16) instructions.

DATA BIT D4=1

Description: Initiates horizontal scrolling of the display.

DATA BIT D5=1

Description: Initiates vertical scrolling of the display.

DATA BIT D6=1

Description: When used with one of the display mode instruction nos. 2–15, above, this flag bit designates the instruction as being a 3-byte instruction and that the two bytes sequentially following the instruction byte (containing the flag bit) are to be transferred to the memory scan counter 84. When used with a jump instruction (instruction no. 16), a logical one (D6=1) designates that after the jump is executed the object generator 44 is to wait until the end of the next vertical blank interval before transferring the next instruction from the memory unit 42 to the instruction register 88 (FIG. 4A).

DATA BIT D7=1

Description: Enables interrupts to be generated by the graphics generator.

2. Display Graphics Generation

With this general understanding of the significance of the instruction data bits, it is possible to discuss the graphics produced by the object graphics generator 44 in response to various instructions in detail.

a. Playfield Object Generation

Generally, it is only the playfield objects that are generated in response to and under the supervision of the instruction set. Instructions generally dictate where in the memory unit 42 the graphics information to be transferred to the display unit 22 is located, in what fashion the transfer will be made and how the information will be displayed. Typically, playfield objects (such as, for example, alphanumerics, horizontal and vertical lines, and the like) are generated using one of two different methods. These two methods of object graphics generation are hereinafter referred to as "memory map" and "character" display modes. Essentially, both display modes utilize graphics information that is stored in the memory unit 42; both display modes cause the graphics information to be transferred from the memory unit to the playfield generator 44A where it is, in effect, converted to serial video information by the playfield graphics shift register 122 (FIG. 4A). However, the techniques differ in the way the graphics information is accessed from the memory unit 42 and, therefore, will be discussed separately.

(i) Memory Map Display Mode

Graphics information may be stored in the memory unit 42 in blocks of consecutive addressable memory locations such as, for example, the playfield graphics block 286 (FIG. 7). Referring to FIG. 4A, the playfield object generator operation commences when the MPU 40 (FIG. 3) writes a two-byte (16-bit) address into the display list counter 82. The MPU 40 also transfers an 8-bit data word to the DMA control register 101 to enable the playfield object generator 44A and initiate generator operation.

The data transferred by the MPU 40 to the display list counter 82 is the address of a memory location in the memory unit 42 containing the first instruction. Once the playfield object generator is enabled, control and timing signals are issued by the DMA control unit to initiate a HALT signal, followed by a read operation to transfer the contents of the memory location designated by the address supplied by the display list counter 82 to the instruction register 88 via the data bus 60. Typically, this first instruction will cause generation of a number of blank horizontal lines (i.e., instruction no. 1). As each horizontal line is generated, the line counter 96 is incremented by the DMA control unit 90. Upon completion of the last of the horizontal lines designated to be generated by the instruction, a compare is detected by the compare circuit 98 between the line counter 96 and the data bits D6–D4 of the instruction (which are communicated to the compare circuit 98 via the multiplexer (MPX) 95 under control and supervision of signals from the DMA control unit 90). The compare circuit 98 provides a LAST LINE signal that is communicated to the DMA control unit 90 via signal line 100. During the horizontal blanking interval immediately following the last generated horizontal line, the DMA control unit 90 issues a signal that increments by one the contents of the display list counter 82 which, in turn, provides the address for memory unit 42 to obtain the next sequential instruction following the blank instruction (or instructions, if more than one) just completed.

Typically, if playfield object information is to be displayed, the next instruction will be one of instruction nos. 2–6, with its flag bit D6 set to a logical one. Two facts are specified by the instruction—which the DMA control unit 90 becomes cognizant of when the instruction is transferred to the instruction register 88 and is decoded by the control unit 90: (1) The instruction is a 3-byte instruction with the two additional bytes located in memory unit 42 at memory locations immediately following that of the instruction byte just transferred; and (2) these two additional bytes designate a memory location, sequentially followed by a number of other memory locations, containing graphics information to be displayed. Once the instruction is determined to be a 3-byte, memory map mode instruction, the display list counter 82 is incremented, as apropriate, and the two bytes of data following the first instruction byte are transferred sequentially from the memory unit 42 via the data bus 60 to the memory scan counter 84. The transfer of the two bytes, including the incrementing of the display list counter, was preceded by a HALT command and accomplished under the supervision and control of signals generated by the DMA control unit 90.

The memory scan counter 84 now contains the first address of a sequential list of bytes containing graphics data. The DMA control unit 90 initiates a memory read operation, using the contents of the memory scan counter 84 as the address that is communicated to the memory unit 42 via the address bus 62. The byte of information so accessed is transferred from the memory unit 42 via the data bus 60 to the display RAM 114 where the byte is stored. At the same time, and under control of the DMA control unit 90, the information is communicated via the multiplexer 120 to the playfield graphics shift register 122. Pursuant to control signals from the DMA control unit 90, the register control unit 121 selects one of four clocks (2 CLK, CLK, CLK/2, or CLK/4) for application by the control unit 121 to the shift register 122.

The byte of graphics information is then clocked out of the playfield graphics shift register 122 and communicated via signal line 123a or both signal lines 123a and 123b (depending upon whether one or two bits at a time are to be shifted) to the playfield encode logic 124. There, depending upon the state of the bit or bits being applied the playfield encode logic 124, one of the four output lines PF∅, PF1, PF2 or PF3 will be activated.

The operation continues: A sequentially ordered number of bytes of graphics information is transferred from the memory unit 42 to the playfield generator 44A. As the playfield generator receives each byte, it is communicated to and through the display RAM 114 (where each byte is stored) and placed in shift register 122 where it is converted to video information that appears on one of the output lines PF∅–PF3. This video information is applied to the priority encoder 144 (FIG. 4B) and used to select one of the color-luminance registers 176 as will be described more fully below.

If the instruction being executed is one which generates only one line of memory map graphics (e.g., instruction nos. 2, 3 or 5), a new instruction must be transferred to the instruction register 88 during the horizontal blanking interval following the completed horizontal line. If, on the other hand, the instruction being executed requires 2, 4 or 8 lines of display (e.g., instruction nos. 4, 6 or 7–9), the graphics information now contained in the display RAM 114 is used. This procedure is illustrated in FIG. 9.

Referring to both FIGS. 4A and 9, assume that instruction no. 8 of Table I is being executed. Assume further that the flag bit of the instruction (D6) is set to a logic one—indicating that the instruction is a three-byte instruction and that the two additional bytes contain the address of the graphics information to be used. Located in a section 42' of the memory unit 42 are a number of sequentially ordered one-byte memory locations, including memory locates 350a–350e, each memory location containing graphics information. After the instruction is transferred to the instruction register 88, and the two bytes of address transferred to the memory scan counter 84, the playfield object generator commences sequential access of the memory unit 42, using address signals provided by the memory scan counter 84. The contents of memory locations of memory section 42' are sequentially transferred, one byte at a time, to the display RAM 114 and are temporarily stored. As each byte is transferred to the display RAM 114, the byte is immediately read and transferred to the shift register 122 via the multiplexer 120. The shift register 122 transfers the information, as described above to the playfield logic 124 via signal line 123a where, using the code shown in FIG. 9, one of the output lines PF∅ or PF1 is selected.

The graphics information appears on the display screen 22' as color-luminance values specified by the selected PF∅ or PF1 lines. Once the first horizontal scan line 354 of the instruction has been completed the display line portion 22' the graphics information used to generate the line remains stored in the display RAM 114, ordered in the same manner as in the memory unit 42. The next succeeding three lines 356, 358 and 360, are generated by sequentially accessing the graphics information from the display RAM 114. Thus, during the active scan of the lines 356, 358 and 360 the display RAM 114 is addressed by the RAM access counter 116 in response to appropriate timing and control signals from the DMA control unit 90. Upon completion of the last horizontal line 360 to be generated by the instruction, a LAST LINE signal is generated by the compare circuit 98 to initiate fetching a new instruction.

As noted, the instruction (instruction no. 8) caused transfer of each byte of graphics from the shift register 122 on signal line 123a to the playfield encode logic 124 one bit at a time. Encode logic 124, in turn, communicates the graphics to the priority encoder 166 and collision detection unit 164 (FIG. 4B) by via either the PF0 or PF1 signal lines. The particular line selected depends upon the particular binary state of the signal appearing on the signal line 123a. Assuming for the moment that there is no graphics information on the four output signal lines 172, indicative of a movable object, the playfield graphics information communicated on either the PF0 or PF1 signal lines is used to select a one or another of the color-luminance registers 178 for obtaining the color and luminance values to be used.

FIG. 10 illustrates a portion of the circuitry of the color-luminance selection unit 178, together with the color-luminance registers 176a-176d corresponding to the playfield graphics signal lines PF0-PF3. While FIG. 10 only illustrates the selection logic used for the PF0-PF3 signal lines, it will be readily evident that substantially similar logic circuits can be implemented for the movable object graphics and their corresponding color-luminance registers 176.

The pertinent portion of the selection unit 178 of FIG. 10 includes AND gates 372a-372d used for selecting four bits of color information contained in a one of the registers 176a-176d; similarly, AND gates 374a-374d each have three bits of luminance information communicated thereto from color-luminance registers 176a-176d, respectively. To avoid complexity, the AND and OR gates shown in FIG. 10 are depicted as individual gates. However, as will be apparent to those skilled the art, the individual gates depicted are actually multiple gates in parallel configuration. For example, although the AND gate 372a is depicted as a single two-input AND gate, the AND gate 372a represents four parallel two-input AND gates. This is true for the AND gates 372b-372d. Similarly, each of the AND gates 374a-374d represents three parallel, two-input AND gates. The individual OR gates 375a and 375b are similarly simplified. However, the OR gates 375a and 375b receive information communicated thereto from player-missils color-luminance registers 176e-176h (FIG. 14) via similar enabling circuits as that represented by AND gates 372a-372d and 374a-374d. Accordingly, the OR gate 375a represents four parallel, eight-input OR gates while OR gate 376b represents three parallel, eight-input OR gates.

The AND gates 372a-372d selectively communicate the four bit color information contents of one of the color-luminance registers to OR gate 375a which then couples the color information on the four signal lines 184 to the delay line tap select 182 (FIG. 4B). In similar manner the AND gates 374a-374d selectively communicate the 3-bit contents indicative of a luminance value of one of the registers 176a-176d to OR gate 375b and from there to a 3-bit digital-to-analog converter (DAC) 376. The DAC 376 converts the three bits of information to a voltage level that appears on signal line 180 and is coupled thereon to the video summer 52 (FIG. 4B).

As noted above, only one of the priority encoder output lines 1-8 is active at any one time; which priority encoder line 1-8 is active depends upon the information received. For example, information on any of the playfield graphics signal lines PF0-PF1 (FIG. 4B) will cause one of the priority encoder outputs 1-4, respectively, to be active. In turn, the active priority encoder output 1-4 will select, via AND gates 372a-372d, which four-bit portion (onctaining color information) of color-luminance registers 176a-176d will be transferred to the delay line tap select 182 on the four signal lines 184. In similar fashion the three-bit portion (containing luminance information) of one of the color-luminance registers 176 will be communicated to the DAC 376 and converted to a voltage level indicative of luminance that is applied to the signal line 180.

The playfield graphics lines correspond to the priority encoder output lines 1-4, respectively. Thus, referring to FIGS. 4A, 4B, 9 and 10, when graphics information is communicated, one bit at a time, from the graphics shift register 122, one of the playfield graphics lines PF0 or PF1 is activated. In turn (again, assuming no movable graphics information—a situation which will be described below), one of the output lines 1-2 of the priority encoder 166, corresponding to the PF0 or PF1 signal lines, respectively, will enable the AND gates 372a, 374a and 372b, 374b to select the contents of the corresponding register 176a or 176b. Thus, with reference to the four display line portion 22' illustrated in FIG. 9, if the graphics information bit is a logic zero, the color and luminance designated as PF0' is dictated by the contents of the PF0 register 176a. Similarly, a logic one will display objects, such as that designated PF1' in FIG. 9, having color and luminance specified by the contents of the PF1 register 176b.

The instruction (no. 8) considered above (and instruction nos. 2, 5 and 6) communicate or map, in effect, sections of the memory unit 42 to the display unit 22, a single bit at a time, each bit designating one of two corresponding registers containing the color and luminance characteristics that are to be displayed. However, other of the instructions (e.g., instruction nos. 3, 4, 7 and 9) of Table I also generate playfield graphics in this memory map mode: however, as indicated in the Table, each byte of information is applied to the playfield encode logic 124 two bits at a time. This concept is illustrated in FIG. 11. Three representative bytes 377a-377c are shown as they would be sequentially transferred from the memory unit 42 (FIG. 3) to the shift register 122 (FIG. 4A); that is, byte 377a would be transferred first in time, followed by bytes 377b and then 377c. If the playfield object generator 44A is presently under the control of one of the instruction nos. 3, 4, 7 or 9 of Table I, each byte is coupled from the graphics shift register 122 two bits at a time and appear to the playfield encode logic as compressed 2×4 blocks of data 378a-378c. Depending upon the logic states of the individual bits transferred, the logic signal appearing on output lines 123a and 123b at any moment in time can achieve one of four possible states. As indicated in FIG. 11, these states are coded and used to select one of the four output lines PF0-PF3 of the playfield encode logic 124.

In turn, each 2-bit segment of graphics information applied to the playfield encode logic 124 (FIG. 4A) is coupled therefrom to the priority encoder 166 and the color-luminance register selection unit 178 (FIGS. 4B and 10). There, the information is used to enable the contents of one of the color-luminance registers 176 (i.e., one of registers 176a–176d) to be communicated to signal lines 184 and the DAC 376. It should be noted that in both examples illustrated in FIGS. 9 and 11, a logic zero—whether one or two bits—selects the PF∅ register 176a. Thus, if no movable or playfield object graphics information is applied to the priority encoder during active scan of a horizontal line—as when instruction no. 1 is being executed—the color-luminance characteristics specified by the contents of register 176a will be displayed.

In the preferred embodiment, the number of contiguous elemental beam positions used to construct a given horizontal line of video by the display unit 22 is chosen to be 160 which corresponds to one period of the CLK signal. However, some picture elements may be formed from multiples or submultiples of this figure (e.g. 360, 80 or 40) and a plurality of multiple clock rates are available for this purpose, as described below.

Information is transferred from the playfield graphics shift register 122, be it one bit or two bits at a time, at one of four possible rates, depending upon the instruction being executed by the object generator 44. The available rates are 2CLK, CLK, CLK/2 and CLK/4 where CLK is the timing signal generated by the timing unit 58 and referred to above as specifying each beam position. Thus, any active horizontal line may display 320, 160, 80 or 40 increments of color-luminance playfield information. For example, instruction no. 2, which specifies a data transfer from the shift register 122 at the 2CLK frequency (approximately 7.2 MHz) can cause 320 color-luminance increments during each active horizontal line shown on display unit 22. Alternately, instruction nos. 3–6 will cause the shift register 122 to transfer data at the CLK (approximately 3.6 MHz) frequency to display up to 160 increments of information. Instruction nos. 7 and 8 display 80 (maximum) increments of color-luminance information per horizontal (active) line using a data transfer rate of CLK/2 while instruction no. 9, specifying CLK/4, will transfer up to 40 increments of color-luminance information to the display unit 22 for display. Another way of looking at the correlation between the rate at which graphics information is transferred from the graphics shift register 122 and the maximum number of available color-luminance increments in any horizontal line is in terms of display resolution. Thus, instruction no. 2 specifies a horizontal resolution of 320 increments per line scanned; instruction nos. 3–6 provide a resolution of 160 increments per line; instruction nos. 7 and 8 provide for 80 increments per line; and instruction no. 9 provides a resolution of 40 increments per line.

The number of lines to be generated for each instruction is determined by decoding the instruction operation code. Accordingly, the operation code of each instruction is applied to the ROM 94 to address a memory location of the ROM containing four bits of digital information specifying the number of horizontal display lines for the instruction. The contents of the ROM 94 memory location so designated are applied to compare circuit 98. Line counter 96, which is updated after each line is generated, counts the number of lines so generated and applies that count to the compare circuit. When a comparison is obtained, the LAST LINE signal is generated by the compare circuit 98, indicating that execution of the present instruction is complete and that a new instruction must be obtained to continue the display operation. The LAST LINE signal is communicated via signal line 100 to the DMA control unit 90, which, in turn, causes the contents of the display list counter 82 to be incremented by one. The DMA control unit then supervises a transfer of the next sequential instruction from the memory unit 42 to the instruction register 88 (FIG. 4A). The instruction is decoded and timing and control signals issued by the control unit 90, as specified by the instruction, to continue playfield graphics generation.

To summarize, the memory map mode, using one of the instruction nos. 2–9 of Table i, can direct the generation of playfield objects shown on the display unit 22 by using one or more of the following methods:

a. Graphics is "mapped" from the memory unit 42 to the display unit 22 one horizontal line per instruction (instruction nos. 2, 3 and 5), two lines per instruction (instruction nos. 4 and 6), four lines per instruction (instruction nos. 7 and 8), or eight lines per instruction (instruction no. 9). In multiple line generation, the subsequent lines are duplicates of the first horizontal line—the graphics information being stored in display RAM 114 during the first line and sequentially issued from the RAM for the subsequent lines.

b. Graphics information from memory unit 42 is converted to video information one bit at a time or two bits at a time and used, in the former case, to select one of two possible color-luminance characteristics for display (instruction nos. 2, 5, 6 and 8); or, in the latter case, to select one of four possible color-luminance characteristics (instruction nos. 3, 4, 7 and 9).

c. Horizontal resolution of each line caused to be generated pursuant to an instruction can be 320 elements per line (instruction no. 1), 160 elements per line (instruction nos. 2–6), 80 elements per line (instruction nos. 7 and 8), or 40 elements per line (instruction no. 9).

The entire playfield can, of course, be generated using the memory map mode instructions. However, for such playfield objects as alphanumerics, it has been found preferable to store graphics information in the memory unit 42 in addressable blocks of memory locations; each block contains graphics information describing a predetermined character to be displayed. This mode is referred to as the "character name" mode and is described below.

(ii) Character Name Mode

Playfield graphics information is conveyed from the playfield object generator 44A to the display unit 22 in essentially the manner described above-regardless of the operation mode. However, the manner in which the graphics information is accessed from the memory unit 42 is somewhat different in the character name mode from that used by the memory map mode described above. Further, each instruction (e.g. one of the instruction nos. 10–15) used in the character name mode can cause to be displayed on display unit 22 one complete horizontal row of alphanumeric character information; each displayed horizontal row comprises at least eight horizontal scan lines.

Referring to FIG. 12, there is shown a diagrammatic illustration of this mode of operating the object generator 44. Assume, for purposes of this discussion, that the character instruction 380 (which would be one of instruction nos. 10–15) is the next sequential instruction in a list of instructions stored in memory unit 42 (at memory locations 284 (FIG. 7), for example) and that an active horizontal scan has just been completed on display unit 22. A LAST LINE signal is generated, as described above, and communicated to the DMA control unit 90 (FIG. 4A). Under the supervision and control of the control unit 90, the horizontal line counter 96 is cleared, instruction 380 is fetched, stored in the instruction register 88, decoded and found to be a 3-byte instruction (e.g., the flag bit D6 is set to logic one—see Table I), which it would have to be if this instruction were the first of its type (e.g., character mode) in the instruction list—for reasons that will become evident below.

Again, under supervision of the DMA control unit 90, and using the contents of the display list counter 82 to address the memory unit 42, the two bytes 380a and 380b immediately following the instruction byte are transferred to the 16-bit memory scan counter 84. The two bytes 380a and 380b indicate the address of the block of memory locations 292 (FIG. 7). Each memory location of the block 292, the memory location designated as CN-A, for example, contains data words herein termed character names that are used by the playfield object generator 44A to fetch from the memory unit 42 a sequentially ordered block of bytes 382. The bytes 382 contain graphics information which are transferred to the display unit 22.

As the active scan for the next horizontal line commences the byte CN-A in the memory is transferred to the display RAM 114, where it is stored, and to the character name register 110 under supervision of the DMA control unit 90, using the contents of the memory scan counter 84 to address the memory block 292. Prior to commencement of this instruction, the MPU 40 had transferred infomation to the character base register 112. Now, using the combined contents of the line counter 96, character name register 110 and the character base register 112, as the address a first byte 382a is transferred from memory unit 42 to the graphics shift register 122 and transferred therefrom to the playfield encode logic 124 on signal line 123a.

The character base register 112 contains a base address used to locate the section of the memory unit 42 containing approximately 128 8, 10 or 16-byte blocks 290 (FIG. 7) of graphic information, such as the 8-byte block 382. The character name register 110 contains, typically in ascii format, the address of one of the 128 blocks 290, designating a specific character. Finally, the line counter 96 completes the address of the designated block and is used to specify one of the eight bytes of each block, such as for example, byte 382a-382h of block 382.

During the active scan of the first horizontal line of the instruction, the memory scan counter 84 is sequentially incremented, character names are transferred from the memory unit 42 to the display RAM 114 for storage and to the character name register 110, and a byte of graphics information at the memory location specified by the contents of the registers 110 and 112 and line counter 96 is transferred to the graphics register 122. Upon completion of this first scan line, the line counter 96 is incremented. The character names to be used in generating the remaining display lines called for by the instruction are now sequentially stored in the display RAM 114. Thus, during the remaining horizontal line scans (dictated by the instruction) character graphics information is obtained by merely accessing the contents of display RAM 114 to update the character name register 110; graphics information is transferred in the same manner as the first line. At the end of each horizontal line the line counter 96 is incremented.

Assuming execution of instruction no. 10 of Table I, above, a horizontal swath 386 would be shown on display unit 22 comprising 20 characters across, formed from eight consecutive horizontal display lines. Upon the completion of this instruction, the next sequential instruction 381 is transferred to the instruction register; it may be one of any of the instructions of Table I. For example, it may be another character mode instruction no. 10. If the flag bit of the instruction is set to a logic zero (designating a one-byte instruction) the list of character names 292 will continue from the point the last instruction 380 left off. Alternately, the instruction 381 may designate a list of ordered character names stored elsewhere in memory unit 42, in which case the flag bit D6 of the instruction will be set to a logic one, designating the two bytes immediately following the instruction 381 for transfer to the memory scan counter 84.

One further aspect of the present invention can now be noted. The same address and graphics information can be operated upon by more than one instruction with the same graphic information displayed—differing only in their perspective on the display unit 22. For example, if the horizontal swath of characters 386 was generated by execution of instruction no. 11—where each byte of graphics information is displayed only once—the vertical perspective of the swath 386 can be stretched so that the same information appears on display unit 22 as the horizontal swath 388. This is easily accomplished by merely incrementing the line counter 96 every other horizontal line.

The object graphics generator 44 (FIG. 3) sequentially accesses from memory unit 42 a list of display instructions stored at memory located designated by the address signals provided by the display list counter 82 (FIG. 4A). When the end of a display field of object graphics has been reached—usually at or near the bottom horizontal line scan—the display list counter 82 must be returned to the first display instruction of the list in order to start generating the next display field of object graphics. Accordingly, the jump instruction (instruction no. 16) is used for this purpose. The last instruction of any list of display instructions for directly operation of the object graphics generator 44 will be a three-byte jump instruction; the last two bytes contain the address of the first display instruction of the list. During execution of the jump instruction, the two bytes of address are transferred from the memory unit 42 to buffer registers (not shown) of the display list counter 82. The contents of the buffer registers (not shown) are then transferred to the display list counter 82 and become the address signals provided by the address counter 82, addressing the memory location of memory unit 42 containing the first display instruction of the list used to generate and display a display field of object graphics on display unit 22.

If, as may sometimes be the case, a display field of object graphics ends early—several horizontal lines early—a jump instruction (instruction no. 16) having the flag bit D6 set to a logic one may be used. In this case, a jump is executed in the manner described above. However, further operation of the object graphics generator is halted until the end of the vertical retrace interval of display unit 22. Monitored by the DMA control unit 90, the end of the vertical retrace interval is detected and the DMA control unit 90 commences to issue timing and control signals to sequentially transfer and execute the display instruction list, generating again the display field of object graphics.

b. Movable Object Generation

Graphics information is transferred to the graphics registers 152 of the movable object generator 44B (FIG. 4B) from either the MPU 40 or from the memory unit 42. In the latter case, the playfield object generator 44A (FIG. 4A) supervises and controls the transfer. Referring to FIGS. 4A, 4B and 13, the movable object DMA counter 86, which is shown in greater detail in FIG. 13, consists of three sections whose contents form the 16-bit address used to address the memory unit 42 for player and missile graphics information. As shown in FIG. 14, the counter 86 comprises a 6-bit latch 86a, a modulo-five counter 86b, and a 7-bit counter 86c. The contents of the 6-bit data latch 86a form the most significant bits of the 16-bit address, while the contents of the mod-five counter 86b and the 7-bit counter 86c, respectively, form the remainder of the address.

The counter operates by receiving a clock pulse on the signal line 87a which increments the mod-five counter 86b through its five possible logic states: 000, 001, 010, 011 and 100. When the counter 86b reaches its maximum (100) and is incremented to its next (initial) state (000), a carry is generated on signal line 87b to increment the contents of the 7-bit counter.

The graphics information for the player and missile objects is located at memory section 288 of memory unit 42 and contained in five sequentially ordered 256-byte blocks 288a-288e. The bytes of each block 288a-288e are sequentially ordered to correspond to each horizontal scan line of display unit 22.

The particular configuration of the movable object counter 86 described above functions as follows: The contents of the 6-bit data latch 86a addresses that particular section 208 (FIG. 7) of memory locations of the memory unit 42 containing the movable object graphics. The mod-five counter 86b sequentially selects one of five 256-byte blocks 288a-288e of the memory section 288, while the 7-byte counter 86c sequentially selects one of the available 256 bytes from a particular addressed block. Each byte of each block 288a-288e corresponds to a horizontal line scan of display unit 22. Each byte of the 256-byte block 288a contains 2-bits of missile graphics information M1-M4. The 256-byte blocks 288b-288e contain graphics information for the player objects 420-426, respectively. The entire block 288b, for example, is transferred to the display unit 22'. Each byte of the block 288b is display in an ordered sequence that forms a vertical swath 430. The graphics information indicative of player object 420 is displayed as 420' on display unit 22' and has a vertical position on the display that corresponds to its position within the 256-byte block 288b. The same is true for player objects 422, 424 and 426 whih are displayed in vertical swaths 432, 434 and 436, respectively.

As noted above, each missile object requires only two bits per horizontal display line. Thus, each individual one-byte memory location comprising the memory block 288a contains two bits of graphic information for the missile objects M1-M4. In a manner similar to the display of player objects—to be more fully described—the 256 two-bit portions indicative of the missile graphics M1-M4 are displayed as vertical swaths. In FIG. 13, it is assumed that only player objects 422' and 426' (as viewed on display unit 22') have fired their corresponding missiles M2' and M4'. Accordingly, the graphics information contained in the memory locations of block 288a for missiles M2' and M4' are displayed as vertical swaths 438 and 440, respectively.

Still referring to FIGS. 4A, 4B and 13, during a vertical blanking interval, the movable object DMA counter 86 is provided with an initial address by the MPU 40 via the data bus 60. In addition, the MPU 40 transfers a byte of data to each one of the eight horizontal position registers 140; four of the registers 140 correspond to the player objects while the remaining four of the registers 140 correspond to each of the missile objects. The registers 140 now contain information indicative of the horizontal position of the player or missile object on display unit 22'. During the horizontal blanking interval preceding the first horizontal active line scan (and each and every following horizontal blanking interval), the playfield object generator 44A initiates five reads of memory unit 42 using the contents of the movable object DMA counter 86 as the address. Each read is performed during a predetermined time slot of the horizontal blank interval and is preceded by a a HALT command generated by the control unit 90. The DAM register select logic 202 of the movable object generator 44B receives the HALT command and, together with a decoded output from the H-counter supplied by the sync generator unit 146, sequentially generates a SELECT signal on one of five signal lines to the graphics registers 152 via the OR gate 204. The SELECT signal selects and enables one of the four 8-bit (player) graphics registers 152 (i.e., registers 152b-152e in FIG. 13) to receive graphics information from the memory unit 42 via the data bus 60. The graphics information for the missile objects are transferred a byte at a time, the four 2-bit missile graphics registers 152 (shown in FIG. 13 as registers 152a) being loaded at the same time once each horizontal blanking interval.

At the end of each read operation (for player-missile graphics) the movable object DMA counter 86 (i.e., the mod-five counter 86a) is incremented by an increment signal from the DMA control unit 90 via signal line 87a. The contents of the movable object DMA counter 86 will, during each horizontal blanking interval, address one memory location from each of the blocks 288a-288e; the content of each addressed memory location is transferred via data bus 60 to the selected graphics register 152 (i.e., the combined four 2-bit registers 152a or player graphics registers 152b-152e, illustrated in FIG. 13).

During the active scan of each horizontal line, the contents of each horizontal position register are applied to a corresponding one of comparators 142 and compared to the horizontal count provided by sync generator unit 146 via signal lines 148. When the contents of any of the horizontal position registers match the horizontal count provided by the sync generator unit 146, the corresponding comparator 142 initiates a SHIFT command that is communicated to the graphics register control unit 156. In turn, the register control unit 156 commands the corresponding graphics register 152 (i.e., one of the four missile registers 152a or one of the player registers 152b-e in FIG. 13) to serially transfer its contents to the collision detection unit 164, via one of the signal lines 154a (player video graphics) or 154b (missile video graphics); this video graphics is also communicated to the priority encoder 166 via OR gates 170.

It will be remembered that the function of the priority encoder 166 is to determine, in the event of simultaneous overlap of graphics information of two or more objects, which one will be displayed; that is, a determination is made as to which object will overlap which other objects. For example, as particularly explained with reference to FIG. 10, graphics information transferred to the priority encoder 166 from the playfield generator 44A via signal lines PF∅-PF3 will activate encoder output lines 1-4, respectively. In turn, the activated output of encoder 166 selects the contents of one of the color-luminance registers 176a-176d.

Color-luminance selection for movable object graphics is made in the same manner. As illustrated in FIG. 14, the encoder output lines 5-8 are applied to the color-luminance register selection unit 178 to effect selection of the contents of one of the color-luminance registers 176e-176h, corresponding to one player-missile combination.

Each missile object assumes the color and luminance characteristics of its corresponding player object.

To briefly review, and still referring to FIGS. 3, 4A, 4B, 7 and 14, during a vertical blanking interval the MPU 40 transfers horizontal position information to the horizontal position registers 140; additionally, the movable object DMA counter 86 is provided with an address that points to a first byte of the memory section 288, which is also the first byte of the 256-byte block 288a. During each horizontal blanking interval immediately preceding each active horizontal line scan, five bytes of graphics information are fetched from the memory unit 42 using the address provided by the movable object DMA counter 86; each of the five bytes is selected from a different one of the five blocks 288a-288e. During the subsequent active scan of the horizontal line, a window is generated to cause the graphics information to be transferred to the selection unit 178 where, in effect, it is converted to color-luminance information that is then communicated to the display unit 22.

In essence, this method of transfer of graphics information contained within each block 288a-288e of memory locations described above effectively maps each block onto display unit 22'. Horizontal movement of an object displayed in this manner is effected by merely changing the contents of its corresponding horizontal position register 140. It should be evident that this not only effects movement of the object graphics but the entire vertical swath associated with the object. Consider, for example, the swath 430 corresponding to the block 288b of memory locations. In response to manipulation of the player input controls 18 (FIG. 3), MPU 40 calculates a new relative horizontal position for the player object 420' on display unit 22'. During the next vertical blanking interval, MPU 40 writes new horizontal position information to the one of the horizontal position registers 140 corresponding to the object 420'. During each display field, the block 288b of graphics information is sequentially transferred to the movable object generator 44b and then communicated, ultimately to display unit 22' where it is again displayed as the swath 430, but displaced to the right or left.

Vertical movement of the movable object graphics is effected by removing the object grahics from one location within its block and rewriting it at a new location—within the same block, of course. For example, during a vertical blanking interval the object graphics information 420 (FIG. 13) contained within the block 288b of memory locations would be read and transferred to a new location within the block—indicated as object graphics 421. The object graphics 420 is then erased. During the next active display field, the new object graphics 421 would appear on display unit 22 as object 421'.

c. Collision Detection

The graphics information for each movable object are compared to one another and to playfield objects for time coincidence to determine collisions. The collision detection unit 164 (FIG. 4B) includes a number of AND gates (not shown) used to determine time coincidence between movable and playfield objects. Such determinations are communicated to one or more of the sixteen 4-bit collision detection registers 165. Referring to FIGS. 4B and 15, collision detection for a specific movable object (here player 2) is described, it being understood that this description applies equally to the remaining player and missile objects.

As illustrated, graphics information from the player-2 graphics register 152c is communicated to four AND gates 164a-164d contained within the collision detection unit 164. A second input to each one of the AND gates 164a-164d, respectively, are the graphics signal lines PF∅-PF3 for the playfield objects.

In the event the graphics information signal from the graphics register 152c coincides in time with a graphics information signal appearing on one of the playfield graphics signal lines PF∅-PF3, a signal indicative of such coincidence or collision is communicated to a 4-bit data register 162' where it is temporarily stored.

The now stored coincidence information contained in data register 162' is subsequently transferred to the MPU 40 (FIG. 3) when the MPU 40 initiates a READ command, placing an address on the address bus 62 designating the register 162' as the "memory location" to be read. The address of data register 162' is received by the register selection unit 200 (FIG. 4B) which decodes the address and provides an ENABLE signal that is applied to the register 162' to cause the contents of the register to be placed upon the data bus 60 and transferred to the MPU 40.

Typically, the MPU 40 reads all 16 of the collision detection registers 165 in the same manner every vertical blanking interval. After the information contained in the 16 collision detection registers 165 has been transferred to the MPU 40, it initiates a WRITE command. The address placed on the address bus 62 is decoded by the register selection unit 200 and generates a clear (CLR) signal that is applied to the collision detection registers 165 to clear their contents simultaneously.

The collision information obtained by the MPU 40 from the collision detection registers 165 is used for a variety of purposes, depending upon the mode of system operation. For example, information concerning a collision between a movable "target" object (e.g. a ball) and playfield "boundary" object allows the MPU 40 to modify the direction of travel of the target object. Alternately, information indicative of a collision between a player object and a missile object allows the MPU 40 to modify the graphics information indicative of the player to cause display of a simulated explosion. Collision information also allows MPU 40 to tabulate scores as appropriate.

C. Operations

As noted at the outset, the system 10 has two basic modes of operation, selected by providing the system 10 with an appropriate operating program. When operating in the first mode, the system 10 functions as a programmable general purpose computer. The second mode of operation allows the system 10 to function as a video game unit.

There are several ways of providing system 10 with an operating program—thereby selecting the mode of operation: A ROM cartridge 33 (or cartridges if two are required) containing the operating program is inserted into the cartridge receptacles 32 (FIG. 2). Alternately, an operating system program may be stored in a peripheral unit such as, for example, the disk unit 15 or cassette (tape) unit 16. Thus, the desired operating programs so stored may be read into RAM sections of memory unit 42 from a selected peripheral unit.

Regardless of the operating mode in which system 10 functions, however, the operation of the internal circuitry, illustrated by the block diagram of FIG. 3, remains essentially the same. For example, when system 10 is functioning as a general purpose computer for information management purposes—such listing the names and other pertinent data of relatives and friends—the operating program can display portions of the information on display unit 22. Thus, the object graphics generator 44 is called upon to transfer graphics information from memory unit 42 to the display unit 22. The operating program directs the MPU 40 to transfer a predetermined list of display instructions into a RAM section 284 (FIG. 7) of memory unit 42, making the display instructions available to the MPU 40. The MPU 40 can modify portions of the display instructions—primarily the two byte addresses of three-byte instructions—thereby directing the object graphics generator 44 to those sections of memory unit 42 containing the graphics information to be displayed (e.g. alphanumeric characters, lines, heading marks and the like).

Alternately, the operating program may require information to be displayed in graph-like form. Accordingly, a playfield display in the form of a cartesian or other coordinate system may be displayed to the user via display unit 22.

Further, the operating system may call for a movable cursor to be displayed. In such case, the operating system would contain a block of graphics information containing the picture data for the vertical column that the movable object generator 44B constructs on display unit 22—including the picture data for the cursor object. The MPU 40 then "writes" into the movable object DMA counter 86 (FIG. 4A) the address of the location within memory unit 42 of the block of graphics information containing the cursor picture data. The MPU 40 also writes a data word to the DMA control register 101. The contents of the DMA control register informs the DMA control unit 90 that movable object graphics will be displayed. Accordingly, the DMA control unit 90 will provide the movable object DMA counter 86 with signals that cause the DMA counter 86 to sequentially address the memory locations of memory unit 42 containing the graphics information for the cursor. The DMA control unit generates a HALT command that is communicated to the DMA register select logic 202 of the movable object generator 44B (FIG. 4B). Immediately following the HALT command, the DMA control unit 90 initiates an access of memory unit 42, using the address signals provided by the movable object DMA counter 86 to designate the memory locations. At the same time the DMA register select logic 202, using an H-counter decode generated by the sync generator 146, generates a SELECT signal on one of five lines that is communicated to the corresponding graphics register 152. The SELECT signal selects one of the graphics registers 152 to receive and store the information present on the data bus 60. As mentioned above, the selection of the particular one of the graphics registers 156 is determined by the particular time interval within the horizontal blanking period the memory access for movable object graphics is performed; each movable object is provided with a predetermined interval during each horizontal blank time for receiving graphics information. Accordingly, the DMA control unit 80 initiates memory reads during these predetermined time intervals and the DMA register select logic 202 initiates a SELECT signal on the signal line corresponding to the predetermined time interval in response to receipt of the HALT command and an appropriate H-counter decode.

It should be noted that the OR gate 204 depicted in FIG. 4B is representative of five OR gates—each corresponding to one of the five graphics registers 152 (the four 2-bit missile graphics registers are loaded simultaneously and, therefore, treated as single one-byte register for information transfers thereto). Further, each of the OR gates depicted as the OR gate 204 has a SELECT signal communicated thereto from the DMA register select logic 202 and a register select (REG. SELECT) signal from the register select unit 200. This latter signal is used when graphics information is written to one or more of the graphics registers 152 by the MPU 40.

The relative horizontal and vertical movement of the cursor object displayed on display unit 22 is effected by MPU 40 in the manner described alone. New horizontal position information is "written" to the movable object position registers 140 during vertical retrace intervals; rewriting the picture data for the cursor object to a new location within the block of graphics information would typically also be performed by the MPU 40 during the vertical retrace interval.

The data used by the MPU 40 would be provided by the joysticks 18 or operation of the keys 24 by a user. Typically, joysticks 18 would provide user generated position information that is communicated to the MPU 40 via the peripheral interface unit 50. The joysticks 18 can be constructed in the manner disclosed in U.S. Pat. No. 4,091,234, the teachings of which is hereby incorporated by reference.

In summary, the present invention provides a data processing system with a programmable object graphics generator capable of transferring graphics information from a memory unit to a display unit with very little aid from the processor unit of the system. Additionally, movable objects that are generated requiring position determining circuitry for horizontal movement only, thereby obviating the need for additional circuitry for vertical positioning.

Thus, although the best modes contemplated for carrying out the present invention have been herein shown and described, it will be apparent that modification and variation may be made without departing from what is regarded as the subject matter of the invention.

We claim:

1. A raster graphics generator circuit having two modes of operation, a map mode and a character mode. the circuit comprising:
    a digital memory for storing a sequence of display instructions, including map and character instructions, and for storing sequential graphics information, sequential character names, and character blocks of graphics information, each character block comprising a number of bytes, a display list circuit coupled to the digital memory for addresing a sequent display instruction in response to a start signal; and logic circuitry coupled to the digital memory and responsive to an addressed display instruction for operating in one of two modes; a map mode in response to a map instruction and a character mode in response to a character instruction, the logic circuitry including map means operable in the map mode for sequentially addressing the sequential graphics information and for providing raster graphics signals in response to the addressed sequential graphics information; the logic circuitry further including character means operable in the character mode for addressing the sequential character names, for storing the addressed character names, for addressing character blocks of graphics information in response to the stored character names, and for providing raster graphics signals in response to the addressed character blocks of graphics information.

2. A raster graphics generator circuit as in claim 1 wherein the logic circuitry further comprises a display memory for storing the addressed sequential graphics information in the map mode corresponding to a horizontal display line, the logic circuitry also comprising repeat means coupled to the display memory and responsive to selected display instructions for providing a repeat of the raster graphics signals for sequent horizontal display lines by addressing the stored sequential graphics information in the display memory.

3. A raster graphics generator circuit as in claim 1 wherein the logic circuitry further comprises a display memory for storing the addressed sequential character names in the character display mode corresponding to one horizontal row of characters, the logic circuitry for addressing the bytes of the character blocks of graphics information associated with the first horizontal display line of the horizontal row of characters in response to the character names stored in the display memory, the logic circuitry also comprising repeat means coupled to the display memory for addressing the bytes of the character blocks of graphics information associated with the sequent horizontal display lines of the horizontal row of characters in response to the character names stored in the display memory.

4. A raster graphics generator circuit as in claim 3, further comprising a line counter (96) for providing a count of the horizontal display lines generated in response to a display instruction, reset means for resetting the line counter in response to a new display instruction, a comparator coupled to the line counter for receiving a number in response to a new display instruction and providing the start signal in response to the count matching the number, wherein the byte of each character block associated with the current horizontal display line is selected in response to the count.

5. A display process system comprising a raster graphics generator circuit as in claim 4, and a processor having direct memory access to the memory means for storing the display instructions, sequential graphics information, sequential character names and character blocks of graphics information in the digital memory.

6. A display processor system comprising a raster graphics generator circuit as in claim 3, and a processor having direct memory access to the digital memory for storing the display instructions, sequential graphics information, sequential character names and character blocks of graphics information in the digital memory means.

7. A raster graphics generator circuit as in claim 1, wherein in the map mode the logic circuitry sequentially addresses the sequential graphics information and synchronously provides the first raster graphics signals.

8. A raster graphics generator circuit as in claim 30, wherein the raster graphics signals corresponding to a horizontal display line are provided at a uniform frequency.

9. A graphics generator selectively operable in a memory map mode for accessing sequentially ordered video data or in a character mode for accessing a plurality of characters corresponding to a horizontal row, the graphics generator comprising:

a digital memory for storing graphics information and display instructions, the graphics information including the video data and a plurality of character blocks, wherein each character block corresponds to one of the plurality of characters, the display instructions arranged in a sequence and including map and character display instructions;

an address generator coupled to the digital memory for accessing the graphics information and the display instructions in response to control signals;

control means coupled to the digital memory and to the address generator for receiving the accessed display instructions and for generating control signals including:

1. first control signals in response to receipt of the map display instruction to cause the address generator to sequentially access the video data;
2. second control signals in response to receipt of the character display instruction to cause the address generator to sequentially access character blocks corresponding to a horizontal row, and after all responsive first and second control signals have been generated,
3. third control signals to cause the address generator to access the sequent display instruction.

10. The graphics generator of claim 9, wherein the display instructions include repeat instructions and the video data is adapted to be displayed as a horizontal line, the graphics generator further including a buffer memory coupled to the digital memory and operable to store accessed video data corresponding to the horizontal line and an address circuit for accessing the video data stored in the buffer memory in response to the repeat instruction.

11. The graphics generator of claim 9, the digital memory having sequential memory locations containing address data words, each address data word containing information indicative of the location in the digital memory of a corresponding character block; the graphics generator further including a buffer memory operable to store a number of the address data words corresponding to the horizontal row in response to a character instruction; and means responsive to the second control signals for sequentially retrieving the temporarily stored address words from the second storage, the accessing means being responsive to the retrieval address data words to cause access of the selected ones of the block of bytes.

12. The graphics generator of claim 11, wherein the buffer memory is coupled to the address generator, the graphics generator further including an address circuit coupled to the buffer memory for sequentially addressing the stored address data words, the address generator accessing character blocks selected in response to the addressed data words.

13. In a display system of the type including a video display unit for displaying video information in response to a video signal and memory means having a plurality of addressable memory locations for storing at least first and second display instructions, graphics data and address data, a graphics generator, comprising:

addressing means coupled to the memory means;

control means coupled to the memory means for receiving the display instructions and for providing therefrom a plurality of first and second control signals;

converting means coupled to the memory means and to the control means for receiving the graphics data and for forming therefrom a video signal having display characteristics defined by predetermined ones of the control signals; and communicating means coupled to the converting means for conducting the video signal to the video display unit;

the graphics generator adapted to be selectively operable in two modes in response to the first and second display instructions:

(a) a first mode defined by the first display instructions to cause the first control signals to be provided by the control means, the addressing means being coupled to the control means and responsive to the first control signals to generate sequential address signals indicative of memory locations containing graphics data; and (b) a second mode defined by the second display instructions to cause the second control signals to be provided by the control means, the addressing means being responsive to the second control signals to alternately access the address data, to receive the address data and generate therefrom third address signals indicative of memory locations containing selected portions of the graphics data.

* * * * *